US011981103B2

(12) United States Patent
Schroeder

(10) Patent No.: US 11,981,103 B2
(45) Date of Patent: May 14, 2024

(54) END FLAP ENGAGEMENT ASSEMBLY FOR ERECTING CARTONS AND RELATED SYSTEMS AND METHODS

(71) Applicant: Graphic Packaging International, LLC, Atlanta, GA (US)

(72) Inventor: Derek Schroeder, Xenia, OH (US)

(73) Assignee: Graphic Packaging International, LLC, Atlanta, GA (US)

(*) Notice: Subject to any disclaimer, the term of this patent is extended or adjusted under 35 U.S.C. 154(b) by 100 days.

(21) Appl. No.: 17/557,200

(22) Filed: Dec. 21, 2021

(65) Prior Publication Data

US 2022/0194043 A1 Jun. 23, 2022

Related U.S. Application Data

(60) Provisional application No. 63/129,060, filed on Dec. 22, 2020.

(51) Int. Cl.
*B31B 50/06* (2017.01)
*B31B 50/00* (2017.01)
(Continued)

(52) U.S. Cl.
CPC .......... *B31B 50/06* (2017.08); *B31B 50/0044* (2017.08); *B31B 50/802* (2017.08); *B31B 2100/00* (2017.08); *B31B 2120/30* (2017.08)

(58) Field of Classification Search
CPC ... B31B 50/06; B31B 50/0044; B31B 50/802; B31B 50/78; B31B 50/322;
(Continued)

(56) References Cited

U.S. PATENT DOCUMENTS

| | | | |
|---|---|---|---|
| 1,474,088 | A | 11/1923 | Reynolds |
| 1,516,090 | A | 11/1924 | Gary et al. |

(Continued)

FOREIGN PATENT DOCUMENTS

| | | |
|---|---|---|
| CA | 2 384 311 | 3/2001 |
| CA | 2 586 472 | 5/2006 |

(Continued)

OTHER PUBLICATIONS

International Search Report and Written Opinion for PCT/US2021/064502 dated May 30, 2022.

*Primary Examiner* — Thomas M Wittenschlaeger
(74) *Attorney, Agent, or Firm* — Womble Bond Dickinson (US) LLP

(57) ABSTRACT

A method of at least partially erecting a carton with a carton forming system includes loading a blank in a blank infeed assembly, the blank having a plurality of panels and a plurality of end flaps foldably connected to a respective panel of the plurality of panels. The method further includes positioning the blank on at least one conveyor assembly, operating the at least one conveyor assembly to move the blank in a downstream direction of the system toward a carton erection assembly, the carton erection assembly including an end flap engagement assembly positioned adjacent the at least one conveyor assembly, and rotating the end flap engagement assembly such that a portion of the end flap engagement assembly contacts and moves at least one end flap of the plurality of end flaps of the blank as the blank moves in the downstream direction.

22 Claims, 16 Drawing Sheets

(51) Int. Cl.
*B31B 50/80* (2017.01)
*B31B 100/00* (2017.01)
*B31B 120/30* (2017.01)

(58) Field of Classification Search
CPC . B31B 50/324; B31B 50/004; B31B 50/0042; B31B 50/005; B31B 2100/0022; B31B 2100/00; B31B 2120/30; B65B 43/265
See application file for complete search history.

(56) References Cited

U.S. PATENT DOCUMENTS 1,664,111 A 3/1928 Johnson
2,092,858 A 9/1937 Richard
2,095,910 A 10/1937 Bergstein
2,099,257 A 11/1937 Bergstein
2,107,946 A 2/1938 Inman
2,114,625 A 4/1938 Bergstein
2,134,057 A 10/1938 Potdevin
2,132,966 A 11/1938 O'Brien
2,166,388 A 7/1939 Bergstein
2,197,113 A 4/1940 Piazze
2,250,249 A 7/1941 Bergstein
2,273,470 A 2/1942 Gardner
2,282,207 A 5/1942 Palmer
2,286,465 A 6/1942 Erlin
RE23,096 E 4/1949 Mullinix
2,502,117 A 3/1950 Anderson
2,553,923 A 5/1951 Lambert
2,758,520 A 8/1956 Hepworth
2,799,211 A 7/1957 Zerlin
2,835,435 A 5/1958 Mullinix
2,870,023 A 1/1959 Vogt
2,913,161 A 11/1959 Travis
2,987,402 A 6/1961 Dold
3,104,596 A 9/1963 Bergstein
3,105,417 A 10/1963 Hammer
3,142,231 A 7/1964 Christensson
3,142,430 A 7/1964 Meyers
3,153,991 A 10/1964 Goodrich
3,194,471 A 7/1965 Murphy
3,218,961 A 11/1965 Kraft et al.
3,240,419 A 3/1966 Spiering et al.
3,249,286 A 5/1966 Palmer
3,250,454 A 5/1966 Steiger
3,272,423 A 9/1966 Bjarno
3,324,998 A 6/1967 Farquhar
3,336,846 A 8/1967 Berghgracht
3,357,631 A 12/1967 Aid et al.
3,395,623 A 8/1968 Baker
3,399,818 A 9/1968 Stegner
3,412,925 A 11/1968 Booth
3,428,235 A 2/1969 Randazzo
3,459,357 A 8/1969 Egger et al.
3,461,642 A 8/1969 Langen et al.
3,482,758 A 12/1969 Pierre
3,515,333 A 6/1970 Kotkas et al.
3,543,469 A 12/1970 Ullman
3,552,640 A 1/1971 Young
3,554,434 A 1/1971 Anderson
3,570,751 A 3/1971 Trewella
3,575,409 A 4/1971 Calvert
3,576,290 A 4/1971 Marchisen
3,616,027 A 10/1971 Honsel
3,627,541 A 12/1971 Farquhar
3,637,130 A 1/1972 Farquhar
3,659,777 A 5/1972 Kanada et al.
3,739,545 A 6/1973 Lattke
3,800,677 A 4/1974 Jones et al.
3,878,771 A 4/1975 Malcolm
RE28,554 E 9/1975 Curler et al.
3,945,870 A 3/1976 Johnsen
3,959,950 A 6/1976 Fukuda
3,964,669 A 6/1976 Sontag et al.
3,981,494 A 9/1976 Prestegaard
4,011,983 A 3/1977 Greene
4,034,658 A 7/1977 Sherman
4,082,216 A 4/1978 Clarke
4,164,171 A 8/1979 Meyers et al.
4,170,928 A 10/1979 Beasley
4,196,035 A 4/1980 Reil
4,228,945 A 10/1980 Wysocki
4,244,281 A 1/1981 Kauffman et al.
4,267,955 A 5/1981 Struble
4,284,205 A 8/1981 Hirata
4,312,451 A 1/1982 Forbes, Jr.
4,313,542 A 2/1982 Roberts et al.
4,331,434 A 5/1982 Buschor
4,359,214 A 11/1982 Eldridge
4,398,636 A 8/1983 Baxter
4,457,483 A 7/1984 Gagne
4,477,014 A 10/1984 Brandenburger
4,478,351 A 10/1984 Homma
4,484,683 A 11/1984 Werner, Jr.
4,490,960 A 1/1985 Klemesrud
4,494,785 A 1/1985 Song
4,520,615 A 6/1985 Engler
4,575,000 A 3/1986 Gordon et al.
4,577,746 A 3/1986 Tokuno et al.
4,578,929 A 4/1986 Tisma
4,582,315 A 4/1986 Scarpa et al.
4,589,862 A * 5/1986 Murrah .................. B31B 50/00 53/565
4,600,346 A 7/1986 Podosek
4,605,464 A 8/1986 Slevin
4,608,259 A 8/1986 Cortopassi
4,627,223 A 12/1986 Janhonen
4,726,170 A 2/1988 Sawa et al.
4,747,703 A 5/1988 Cazes
4,754,914 A 7/1988 Wischusen, III
4,775,771 A 10/1988 Pawlowski
4,785,696 A 11/1988 Martiny
4,793,117 A 12/1988 Raudat et al.
4,802,664 A 2/1989 Larsen
4,854,983 A 8/1989 Bryniarski et al.
4,865,921 A 9/1989 Hollenberg
4,881,934 A 11/1989 Harston et al.
4,890,439 A 1/1990 Smart
4,919,785 A 4/1990 Willey et al.
4,930,639 A 6/1990 Rigby
4,936,935 A 6/1990 Beckett
4,940,200 A 7/1990 Sawyer
4,963,424 A 10/1990 Beckett
4,986,522 A 1/1991 Paulson
4,995,217 A 2/1991 Francis, Jr.
5,014,582 A 5/1991 Teik
5,019,029 A 5/1991 Calvert
5,028,147 A 7/1991 Graham
5,034,234 A 7/1991 Andreas et al.
5,071,062 A 12/1991 Bradley et al.
5,078,273 A 1/1992 Kuchenbecker
5,080,643 A 1/1992 Mitchell et al.
5,093,364 A 3/1992 Richards
5,096,723 A 3/1992 Turpin
5,097,651 A 3/1992 Decottignies
5,102,385 A 4/1992 Calved
5,102,485 A 4/1992 Keeler et al.
5,108,355 A 4/1992 Walsh
5,117,078 A 5/1992 Beckett
5,132,124 A 7/1992 Tamaki et al.
5,154,041 A 10/1992 Schneider
5,175,404 A 12/1992 Andreas et al.
5,176,612 A 1/1993 Calvert et al.
5,199,792 A 4/1993 Roosa
5,205,651 A 4/1993 Decottignies
5,207,629 A 5/1993 Walsh
5,213,902 A 5/1993 Beckett
5,221,419 A 6/1993 Beckett
5,242,365 A 9/1993 Counts
5,254,071 A 10/1993 Laroche
5,260,537 A 11/1993 Beckett
5,266,386 A 11/1993 Beckett
5,282,349 A 2/1994 Siegel
5,282,528 A 2/1994 Hudson

(56) References Cited

U.S. PATENT DOCUMENTS

| | | | |
|---|---|---|---|
| 5,326,022 A | 7/1994 | Green | |
| 5,330,099 A | 7/1994 | Beales et al. | |
| RE34,683 E | 8/1994 | Maynard | |
| 5,337,951 A | 8/1994 | Roccaforte | |
| 5,340,436 A | 8/1994 | Beckett | |
| 5,346,311 A | 9/1994 | Siler et al. | |
| 5,352,178 A * | 10/1994 | Pazdernik | B65B 43/39 493/137 |
| 5,354,973 A | 10/1994 | Beckett | |
| 5,410,135 A | 4/1995 | Pollart | |
| 5,411,165 A | 5/1995 | Ellis | |
| 5,424,517 A | 6/1995 | Habeger | |
| 5,427,267 A | 6/1995 | Willman | |
| 5,484,100 A | 1/1996 | Rigby | |
| 5,492,269 A | 2/1996 | Sung | |
| 5,510,132 A | 4/1996 | Gallo, Jr. | |
| 5,519,195 A | 5/1996 | Keefer | |
| 5,585,027 A | 12/1996 | Young | |
| 5,615,795 A | 4/1997 | Tipps | |
| 5,628,921 A | 5/1997 | Beckett | |
| 5,632,368 A | 5/1997 | Moncrief | |
| 5,653,671 A | 8/1997 | Reuteler | |
| 5,657,610 A | 8/1997 | Dietrich et al. | |
| 5,662,577 A | 9/1997 | Reuteler | |
| 5,672,407 A | 9/1997 | Beckett | |
| 5,688,427 A | 11/1997 | Gallo, Jr. | |
| 5,746,871 A | 5/1998 | Walsh | |
| 5,759,422 A | 6/1998 | Schmelzer | |
| 5,772,569 A | 6/1998 | Janhonen | |
| 5,783,030 A | 7/1998 | Walsh | |
| 5,800,724 A | 9/1998 | Habeger | |
| 5,845,769 A | 12/1998 | Yeager | |
| 5,876,319 A | 3/1999 | Holton | |
| 5,921,681 A | 7/1999 | Money | |
| 5,938,110 A | 8/1999 | Bernstein | |
| 5,964,161 A | 10/1999 | Conway | |
| 5,997,458 A | 12/1999 | Guttinger et al. | |
| 6,050,063 A | 4/2000 | Ford et al. | |
| 6,063,415 A | 5/2000 | Walters | |
| 6,073,423 A | 6/2000 | House | |
| 6,082,613 A | 7/2000 | Mikulski et al. | |
| 6,114,679 A | 9/2000 | Lai | |
| 6,132,351 A | 10/2000 | Lotto et al. | |
| 6,139,662 A | 10/2000 | Forman | |
| 6,146,028 A | 11/2000 | Preszler | |
| 6,150,646 A | 11/2000 | Lai et al. | |
| 6,204,492 B1 | 3/2001 | Zeng et al. | |
| 6,206,279 B1 | 3/2001 | Countee | |
| 6,213,286 B1 | 4/2001 | Hunter et al. | |
| 6,234,384 B1 | 5/2001 | Capy et al. | |
| 6,251,451 B1 | 6/2001 | Zeng | |
| 6,254,519 B1 | 7/2001 | Toshima | |
| 6,311,457 B1 | 11/2001 | May et al. | |
| 6,312,742 B1 | 11/2001 | Wood et al. | |
| 6,332,488 B1 | 12/2001 | Walsh | |
| 6,335,042 B1 | 1/2002 | Money | |
| 6,349,874 B1 | 2/2002 | Hill | |
| 6,352,096 B1 | 3/2002 | Walsh | |
| 6,360,941 B1 | 3/2002 | Larsson | |
| 6,398,010 B1 | 6/2002 | Fangmeier | |
| 6,401,927 B1 | 6/2002 | Sorensen et al. | |
| 6,414,290 B1 | 7/2002 | Cole | |
| 6,425,847 B1 | 7/2002 | Broenstrup | |
| 6,431,365 B1 | 8/2002 | Money | |
| 6,433,322 B2 | 8/2002 | Zeng et al. | |
| 6,455,827 B2 | 9/2002 | Zeng | |
| 6,490,843 B1 | 12/2002 | May | |
| 6,494,619 B1 | 12/2002 | Sulpizio | |
| 6,509,052 B1 | 1/2003 | Benham et al. | |
| 6,550,608 B1 | 4/2003 | Brown et al. | |
| 6,552,315 B2 | 4/2003 | Zeng et al. | |
| 6,635,139 B2 | 10/2003 | Bohn | |
| 6,637,646 B1 | 10/2003 | Muise | |
| 6,657,165 B1 | 12/2003 | Makutonin | |
| 6,676,583 B2 | 1/2004 | Walsh | |
| 6,677,563 B2 | 1/2004 | Lai | |
| 6,683,289 B2 | 1/2004 | Whitmore et al. | |
| 6,695,202 B2 | 2/2004 | Miess | |
| 6,702,178 B2 | 3/2004 | Bowers et al. | |
| 6,717,121 B2 | 4/2004 | Zeng | |
| 6,744,028 B2 | 6/2004 | Chisholm et al. | |
| 6,765,182 B2 | 7/2004 | Cole | |
| 6,796,930 B2 | 9/2004 | Walsh | |
| 6,854,639 B2 | 2/2005 | Walsh | |
| 6,869,387 B2 | 3/2005 | Post et al. | |
| 6,915,829 B2 | 7/2005 | Popp | |
| 6,948,293 B1 | 9/2005 | Eckermann | |
| 6,948,615 B2 | 9/2005 | Walsh et al. | |
| 6,986,920 B2 | 1/2006 | Forman et al. | |
| 6,993,889 B2 | 2/2006 | Ford et al. | |
| 7,019,271 B2 | 3/2006 | Wnek et al. | |
| 7,070,551 B2 | 7/2006 | Lasson | |
| 7,143,930 B2 | 12/2006 | Money et al. | |
| 7,414,230 B2 | 8/2008 | Fitzwater | |
| 7,445,590 B2 | 11/2008 | Selle et al. | |
| 7,461,838 B2 | 12/2008 | Hendricks et al. | |
| 7,473,875 B2 | 1/2009 | Fitzwater | |
| 7,509,789 B2 | 3/2009 | Scholtes et al. | |
| 7,510,515 B2 | 3/2009 | Ichikawa | |
| 7,604,155 B2 | 10/2009 | Bossel et al. | |
| 7,658,318 B2 | 2/2010 | Walsh et al. | |
| 7,667,167 B2 | 2/2010 | Fitzwater | |
| 7,695,421 B2 | 4/2010 | Ford | |
| 7,699,214 B2 | 4/2010 | Mestre et al. | |
| 7,717,322 B2 | 5/2010 | Walsh et al. | |
| 7,794,147 B2 | 9/2010 | Perelman | |
| 7,819,583 B2 | 10/2010 | Walker et al. | |
| 7,837,606 B2 | 11/2010 | Tetenborg et al. | |
| 7,893,389 B2 | 2/2011 | Fitzwater | |
| 7,913,897 B2 | 3/2011 | Manaige | |
| 7,935,041 B2 | 5/2011 | Graham et al. | |
| 7,938,312 B2 | 5/2011 | Ford | |
| 7,959,060 B2 | 6/2011 | Wilson et al. | |
| 7,982,167 B2 | 7/2011 | Fitzwater | |
| 7,984,844 B2 | 7/2011 | Jones | |
| 8,013,280 B2 | 9/2011 | Robison et al. | |
| 8,024,910 B2 | 9/2011 | Graham et al. | |
| 8,025,618 B2 | 9/2011 | Walsh et al. | |
| 8,066,137 B2 | 11/2011 | Sanfilippo et al. | |
| 8,142,077 B2 | 3/2012 | Iannelli, II et al. | |
| 8,196,805 B2 | 6/2012 | Brand et al. | |
| 8,206,033 B2 | 6/2012 | Sato et al. | |
| 8,220,701 B2 | 7/2012 | Fontaine | |
| 8,226,794 B2 | 7/2012 | Fogle | |
| 8,309,896 B2 | 11/2012 | Fitzwater | |
| 8,317,671 B1 | 11/2012 | Zoeckler | |
| 8,323,165 B2 | 12/2012 | Atoui | |
| 8,403,819 B2 | 3/2013 | Zoeckler | |
| 8,403,820 B2 | 3/2013 | Zoeckler | |
| 8,468,782 B2 | 6/2013 | Michalsky et al. | |
| 8,474,163 B2 | 7/2013 | Rubin | |
| 8,479,972 B2 | 7/2013 | Craft | |
| 8,500,330 B2 | 8/2013 | Nomura et al. | |
| 8,579,780 B2 | 11/2013 | Senbo | |
| 8,672,214 B2 | 3/2014 | Manaige | |
| 8,727,204 B2 | 5/2014 | Burke | |
| 8,826,959 B2 | 9/2014 | Files et al. | |
| 8,870,519 B2 | 10/2014 | Karst | |
| 8,961,380 B2 | 2/2015 | Langen | |
| 9,050,770 B1 | 6/2015 | Russell | |
| 9,073,659 B2 | 7/2015 | Smith | |
| 9,108,761 B2 | 8/2015 | Fitzwater et al. | |
| 9,113,648 B2 | 8/2015 | Burke | |
| 9,156,579 B2 | 10/2015 | Pinkstone | |
| 9,156,582 B2 | 10/2015 | Walsh et al. | |
| 9,238,343 B2 | 1/2016 | Selle et al. | |
| 9,346,234 B2 | 5/2016 | Hajek et al. | |
| 9,346,582 B2 | 5/2016 | Pinkstone | |
| 9,463,896 B2 | 10/2016 | Fitzwater | |
| 9,522,499 B2 | 12/2016 | Files et al. | |
| 9,663,320 B2 | 5/2017 | Wittmann et al. | |
| 9,751,288 B2 | 9/2017 | Walsh | |
| 9,758,275 B2 | 9/2017 | Fitzwater et al. | |
| 9,844,920 B2 | 12/2017 | Walsh | |

(56) References Cited

U.S. PATENT DOCUMENTS

| | | | |
|---|---|---|---|
| 9,957,080 | B2 | 5/2018 | Kastanek |
| 10,023,349 | B2 | 7/2018 | Fitzwater |
| 10,173,805 | B2 | 1/2019 | Waddington |
| 10,179,666 | B2 | 1/2019 | Cain |
| 10,421,572 | B2 | 9/2019 | Moncrief |
| 10,737,824 | B2 | 8/2020 | Fitzwater |
| 11,040,798 | B2 | 6/2021 | Walsh et al. |
| 11,174,065 | B2 | 11/2021 | Walsh et al. |
| 2002/0041067 | A1 | 4/2002 | Muller |
| 2002/0148882 | A1 | 10/2002 | Bowers |
| 2003/0002755 | A1 | 1/2003 | Kim et al. |
| 2003/0024971 | A1 | 2/2003 | Jones |
| 2003/0080120 | A1 | 5/2003 | Whitmore et al. |
| 2003/0144121 | A1 | 7/2003 | Walsh |
| 2003/0185948 | A1 | 10/2003 | Garwood |
| 2003/0197051 | A1 | 10/2003 | Muise |
| 2003/0206997 | A1 | 11/2003 | Winkelman et al. |
| 2004/0004111 | A1 | 1/2004 | Cardinale |
| 2004/0016216 | A1 | 1/2004 | Romagnoli |
| 2004/0074947 | A1 | 4/2004 | Hillebrand |
| 2004/0101605 | A1 | 5/2004 | Sigel |
| 2004/0206049 | A1 | 10/2004 | Hiramoto et al. |
| 2005/0014623 | A1 | 1/2005 | Van De Kruys |
| 2005/0124478 | A1 | 6/2005 | Scholtes et al. |
| 2005/0272583 | A1 | 12/2005 | Totani |
| 2005/0284865 | A1 | 12/2005 | Fogle et al. |
| 2006/0009339 | A1 | 1/2006 | Sleight et al. |
| 2006/0027303 | A1 | 2/2006 | Hunter |
| 2006/0037290 | A1 | 2/2006 | Smith |
| 2006/0049190 | A1 | 3/2006 | Middleton |
| 2006/0096978 | A1 | 5/2006 | Lafferty et al. |
| 2006/0113300 | A1 | 6/2006 | Wnek et al. |
| 2006/0191929 | A1 | 8/2006 | Berg, Jr. et al. |
| 2007/0131742 | A1 | 6/2007 | Fitzwater |
| 2007/0131743 | A1 | 6/2007 | Fitzwater |
| 2007/0131744 | A1 | 6/2007 | Fitzwater |
| 2007/0131745 | A1 | 6/2007 | Fitzwater |
| 2007/0137222 | A1 | 6/2007 | Kastanek et al. |
| 2007/0138247 | A1 | 6/2007 | Fitzwater |
| 2007/0151888 | A1 | 7/2007 | Bossel et al. |
| 2007/0267466 | A1 | 11/2007 | Brand et al. |
| 2008/0067225 | A1 | 3/2008 | Moore |
| 2008/0227612 | A1 | 9/2008 | Harston |
| 2008/0308614 | A1 | 12/2008 | Fitzwater |
| 2009/0005228 | A1 | 1/2009 | Goto et al. |
| 2009/0039077 | A1 | 2/2009 | Fitzwater |
| 2009/0139187 | A1 | 6/2009 | Wood |
| 2009/0193757 | A1 | 8/2009 | Roesler |
| 2009/0197750 | A1 | 8/2009 | Beckmann |
| 2009/0214142 | A1 | 8/2009 | Bossel et al. |
| 2009/0252440 | A1 | 10/2009 | Biese |
| 2010/0022375 | A1 | 1/2010 | Colla |
| 2010/0046861 | A1 | 2/2010 | Wilcoxen |
| 2010/0066007 | A1 | 3/2010 | Muller |
| 2010/0263332 | A1 | 10/2010 | Files et al. |
| 2010/0284634 | A1 | 11/2010 | Hadley |
| 2011/0017812 | A1 | 1/2011 | Belko et al. |
| 2011/0019942 | A1 | 1/2011 | Piraneo |
| 2011/0052106 | A1 | 3/2011 | Holmes et al. |
| 2011/0053746 | A1 | 3/2011 | Desertot |
| 2011/0152050 | A1 | 6/2011 | Hafker et al. |
| 2011/0255809 | A1 | 10/2011 | Tucker et al. |
| 2011/0297680 | A1 | 12/2011 | Howell et al. |
| 2012/0224794 | A1 | 9/2012 | Veder |
| 2012/0231941 | A1 | 9/2012 | Senbo |
| 2012/0267425 | A1 | 10/2012 | Whiteside |
| 2012/0297736 | A1 | 11/2012 | Ausnit |
| 2013/0068653 | A1 | 3/2013 | Lipinski |
| 2013/0202229 | A1 | 8/2013 | Broering |
| 2014/0016882 | A1 | 1/2014 | Fitzwater |
| 2014/0045666 | A1 | 2/2014 | Endou et al. |
| 2014/0113787 | A1 | 4/2014 | Aganovic et al. |
| 2014/0128235 | A1 | 5/2014 | Walsh et al. |
| 2014/0151443 | A1 | 6/2014 | Walsh et al. |
| 2014/0270592 | A1 | 9/2014 | Walsh |
| 2015/0048152 | A1 | 2/2015 | Vistrom |
| 2015/0072848 | A1 | 3/2015 | Graham et al. |
| 2015/0083789 | A1 | 3/2015 | Fitzwater et al. |
| 2015/0353218 | A1 | 12/2015 | Kohn |
| 2015/0367974 | A1 | 12/2015 | Sytema |
| 2016/0107814 | A1 | 4/2016 | Fitzwater |
| 2016/0176179 | A1 | 6/2016 | Walsh |
| 2016/0185065 | A1 | 6/2016 | Sytema |
| 2016/0318274 | A1 | 11/2016 | Walsh |
| 2016/0318275 | A1 | 11/2016 | Walsh |
| 2016/0325877 | A1 | 11/2016 | Kastanek |
| 2016/0368205 | A1 | 12/2016 | Wieduwilt et al. |
| 2017/0015079 | A1 | 1/2017 | Walsh |
| 2017/0050758 | A1 | 2/2017 | Fitzwater |
| 2017/0166384 | A1 | 6/2017 | Walsh et al. |
| 2018/0037360 | A1 | 2/2018 | Walsh et al. |
| 2018/0050511 | A1 | 2/2018 | Walsh et al. |
| 2018/0086018 | A1 | 3/2018 | Fukuda |
| 2018/0169989 | A1 | 6/2018 | O'Hagan et al. |
| 2018/0186541 | A1 | 7/2018 | Jones |
| 2018/0339480 | A1 | 11/2018 | Yanagisawa |
| 2019/0047745 | A1 | 2/2019 | Walsh |
| 2019/0143625 | A1 | 5/2019 | Lau |

FOREIGN PATENT DOCUMENTS

| | | |
|---|---|---|
| CN | 101102887 | 1/2008 |
| CN | 103434294 | 12/2013 |
| DE | 1 060 313 | 6/1959 |
| DE | 11 47 379 | 4/1963 |
| DE | 18 10 965 | 10/1970 |
| DE | 203 00 817 | 4/2003 |
| EP | 0 729 828 | 9/1996 |
| EP | 1 072 526 | 1/2001 |
| EP | 1 424 290 | 6/2004 |
| EP | 1 452 458 | 9/2004 |
| EP | 1 457 425 | 9/2004 |
| EP | 1 353 843 | 4/2005 |
| EP | 1 798 159 | 6/2007 |
| EP | 1 964 785 | 9/2008 |
| EP | 2 487 027 | 8/2012 |
| EP | 2 492 203 | 8/2012 |
| EP | 2 492 204 | 8/2012 |
| EP | 2 748 078 | 10/2016 |
| EP | 2 505 347 | 12/2016 |
| FR | 1 048 714 | 12/1953 |
| FR | 2 516 481 | 5/1983 |
| FR | 2 665 882 | 2/1992 |
| FR | 2 687 384 | 8/1993 |
| GB | 632554 | 11/1949 |
| GB | 2 351 035 | 12/2000 |
| GB | 2 365 000 | 2/2002 |
| JP | S61-232175 | 10/1986 |
| JP | 62-16319 | 1/1987 |
| JP | S63-502418 | 9/1988 |
| JP | 5-28626 | 4/1993 |
| JP | 5-147664 | 6/1993 |
| JP | 09-100840 A | 4/1997 |
| JP | 2004-224402 | 8/2004 |
| JP | 2005-320022 | 11/2005 |
| JP | 2006-240670 | 9/2006 |
| JP | 2006-240671 | 9/2006 |
| JP | 2008-105707 | 5/2008 |
| JP | 2011-168330 | 9/2011 |
| JP | 2011-168331 | 9/2011 |
| JP | 2011-173640 | 9/2011 |
| JP | 2011-189978 | 9/2011 |
| JP | 2010-222050 | 10/2011 |
| JP | 2011-251774 | 12/2011 |
| JP | 2012-51579 | 3/2012 |
| JP | 2012-152901 | 8/2012 |
| JP | 2012-187899 | 10/2012 |
| JP | 2012-533487 | 12/2012 |
| JP | 2018-039167 | 3/2018 |
| KR | 10-2012-1011632 | 9/2012 |
| NL | 87 840 | 11/1957 |
| WO | WO 87/03249 | 6/1987 |
| WO | WO 2006/052326 | 5/2006 |
| WO | WO 2007/067705 | 6/2007 |

(56) References Cited

FOREIGN PATENT DOCUMENTS

| | | | | |
|---|---|---|---|---|
| WO | WO 2007/084525 | | 7/2007 | |
| WO | WO 2008/086277 | | 7/2008 | |
| WO | WO 2009/023286 | | 2/2009 | |
| WO | WO 2010/028485 | A1 | 3/2010 | |
| WO | WO 2011/011283 | | 1/2011 | |
| WO | WO 2011/031545 | | 3/2011 | |
| WO | WO 2011/040994 | | 4/2011 | |
| WO | WO 2013/003149 | | 1/2013 | |
| WO | WO 2013/117983 | | 8/2013 | |
| WO | WO 2014/070232 | | 5/2014 | |
| WO | WO 2015/028825 | | 3/2015 | |
| WO | WO 2016/176540 | | 11/2016 | |
| WO | WO-2018149562 | A1 * | 8/2018 | ............ B65B 3/025 |
| WO | WO 2019/032436 | A1 | 2/2019 | |

* cited by examiner

END FLAP ENGAGEMENT ASSEMBLY FOR ERECTING CARTONS AND RELATED SYSTEMS AND METHODS

CROSS-REFERENCE TO RELATED APPLICATION

This application claims the benefit of U.S. Provisional Patent Application No. 63/129,060, filed on Dec. 22, 2020.

INCORPORATION BY REFERENCE

The disclosure of U.S. Provisional Patent Application No. 63/129,060, filed on Dec. 22, 2020, is hereby incorporated by reference for all purposes as if presented herein in its entirety.

BACKGROUND OF THE DISCLOSURE

The present disclosure generally relates to systems and methods for forming cartons. More specifically, the present disclosure is directed to systems for forming cartons and related methods that include at least one rotational end flap engagement assembly for engaging one or more end flaps of a carton in the course of erecting the carton.

SUMMARY OF THE DISCLOSURE

According to one aspect, the disclosure is generally directed to a method of at least partially erecting a carton with a carton forming system, the method comprising loading a blank in a blank infeed assembly of the system, the blank comprising a plurality of panels and a plurality of end flaps foldably connected to a respective panel of the plurality of panels. The method further comprises positioning the blank on at least one conveyor assembly of the system, operating the at least one conveyor assembly to move the blank in a downstream direction of the system toward a carton erection assembly of the system, the carton erection assembly comprising an end flap engagement assembly positioned adjacent the at least one conveyor assembly, and rotating the end flap engagement assembly such that a portion of the end flap engagement assembly contacts and moves at least one end flap of the plurality of end flaps of the blank as the blank moves in the downstream direction.

According to another aspect, the disclosure is generally directed to a carton forming system for at least partially forming a carton, the system comprising a blank infeed assembly arranged to receive at least one blank comprising a plurality of panels and a plurality of end flaps foldably connected to a respective panel of the plurality of panels, the blank infeed assembly configured to position the at least one blank along a portion of the system, at least one conveyor assembly positioned for receiving the at least one blank from the blank infeed assembly, the at least one conveyor assembly configured to move the at least one blank in a downstream direction of the system, and a carton erection assembly comprising an end flap engagement assembly positioned the at least one conveyor assembly, the end flap engagement assembly rotatably mounted to the system such that a portion of the end flap engagement assembly is positioned to rotatably and move at least one end flap of the plurality of end flaps when the at least one blank moves in the downstream direction of the system.

According to another aspect, the disclosure is generally directed to an end flap engagement assembly, the end flap engagement assembly comprising a hub member, a hub adapter coupled to the hub member, and an end flap engagement lug mounted on an arm coupled to the hub adapter, the hub member defines an interior recess for at least partially receiving a drive shaft such that the end flap engagement lug is positionable to contact and move an end flap of a blank positioned proximate the end flap engagement assembly when the drive shaft is rotated.

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure generally relates to systems including end flap engagement assemblies for forming cartons or other containers, trays, or other constructs for holding articles such as beverage containers. Such beverage containers can be made from materials suitable in composition for packaging the particular food or beverage item, and the materials include, but are not limited to, aluminum and/or other metals; glass; plastics such as PET, LDPE, LLDPE, HDPE, PP, PS, PVC, EVOH, and Nylon; and the like, or any combination thereof.

Cartons according to the present disclosure can accommodate articles of any shape. For the purpose of illustration and not for the purpose of limiting the scope of the disclosure, the following detailed description describes beverage containers (e.g., glass beverage bottles) as disposed within the carton embodiments. In this specification, the terms "inner," "interior," "outer," "exterior," "lower," "bottom," "upper," and "top" indicate orientations determined in relation to fully erected and upright cartons.

Figure 1:
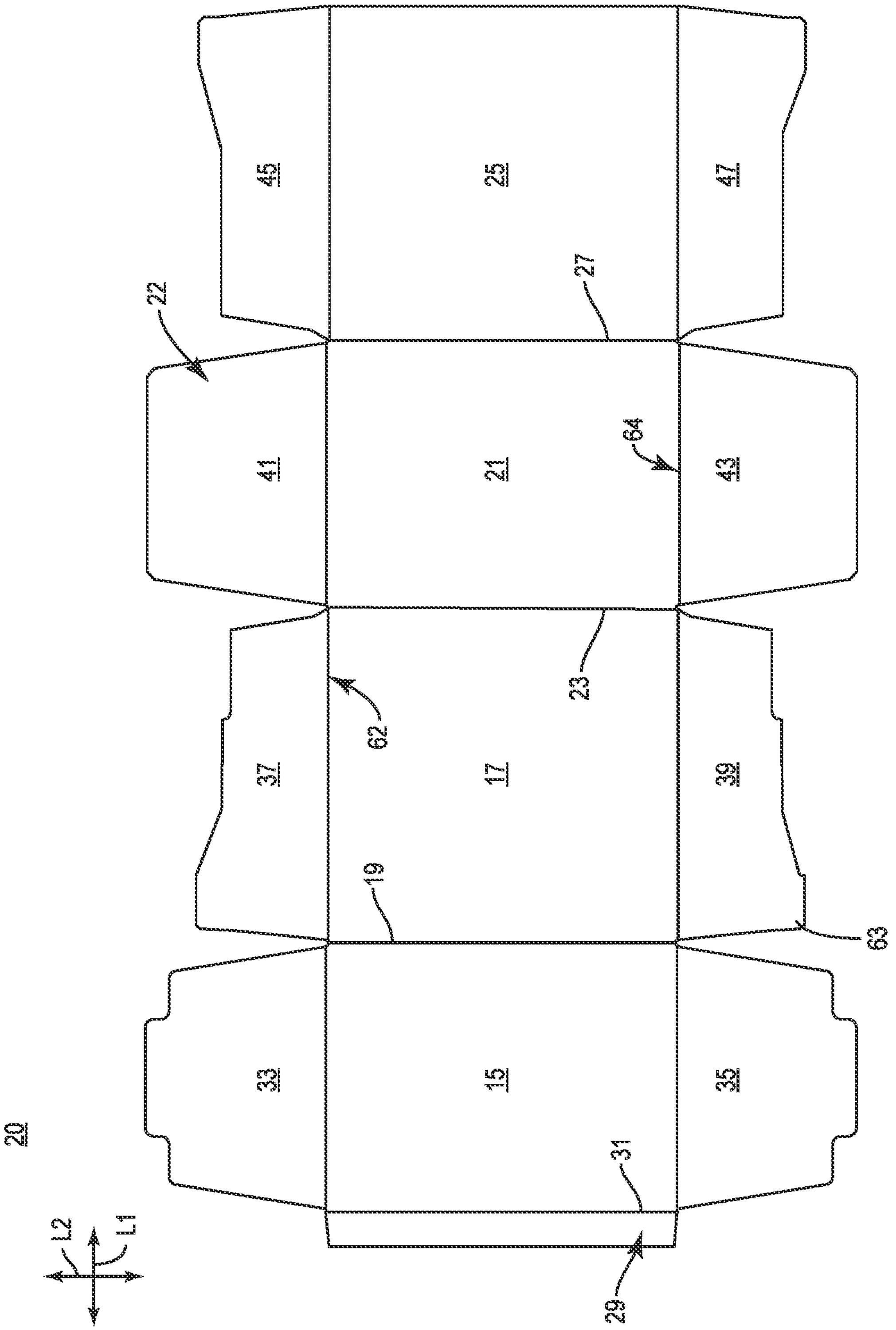
FIG. 1 is a plan view of a blank for forming a carton according to an exemplary embodiment of the disclosure.
Figure 2:
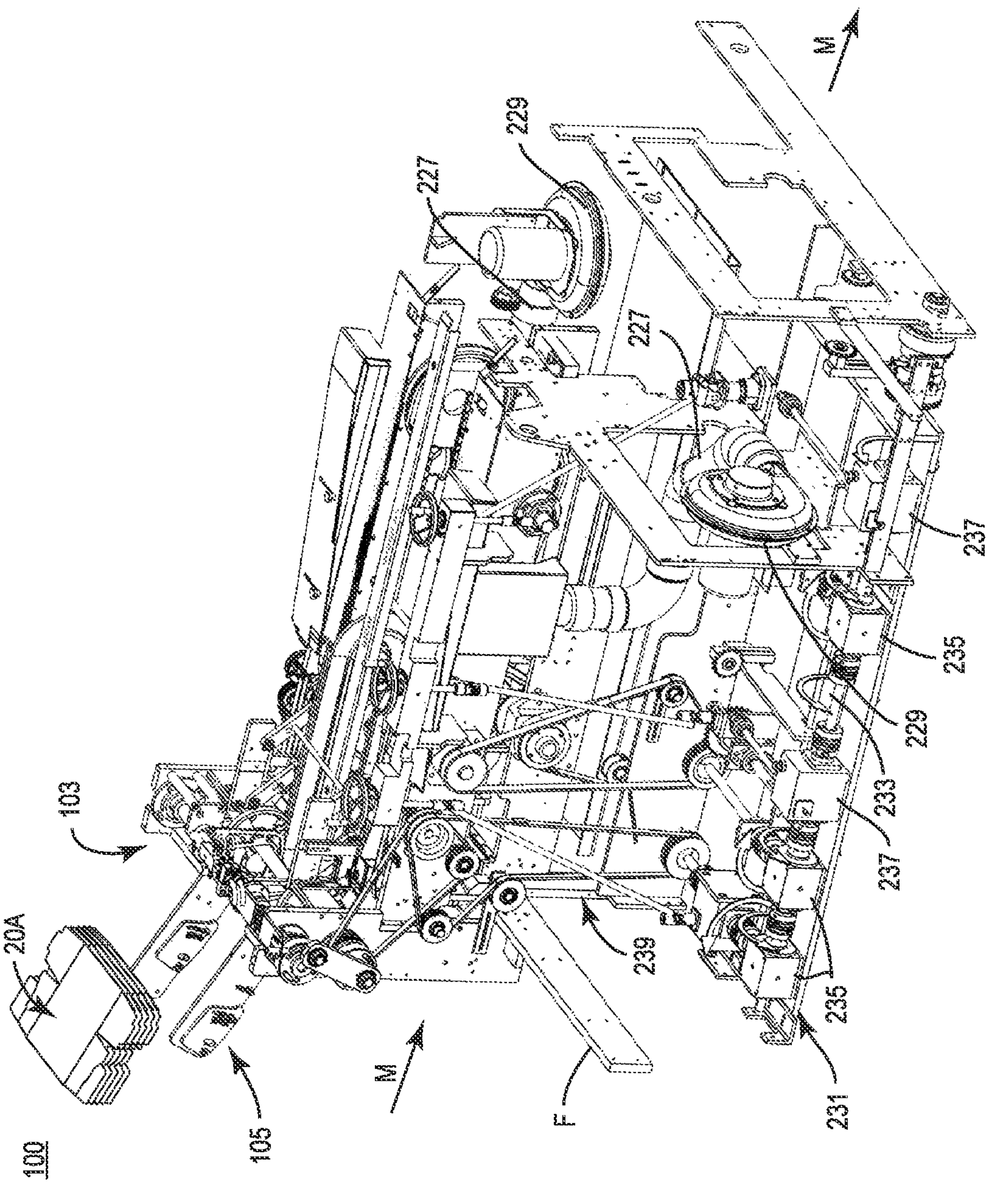
FIG. 2 is a perspective view of a system for at least partially forming a carton according to an exemplary embodiment of the disclosure.

FIG. 1 generally illustrates an example embodiment of system 100 for at least partially forming cartons from blanks 20 (FIG. 2). In the illustrated embodiment, the system 100 engages one or more cartons formed from an at least partially folded configuration of the blanks 20, and includes one or more end flap engagement assembly 145 for engaging one or more end flaps of the blank 20 in the course of at least partially forming, e.g., erecting or otherwise reconfiguring, a carton.

Referring momentarily to FIG. 1, a plan view of the exterior side 22 of a blank, generally indicated at 20, suitable for use with the system 100 to form a carton according to various exemplary embodiments of the disclosure is illustrated. The resulting carton be used to house a plurality of articles such as containers, e.g., metal fluid containers such as aluminum cans, and the carton formed from the blank 20 can be sized to house in various row-by-column and/or tiered arrangements as desired.

The carton blank 20 can have a longitudinal axis L1 and a lateral axis L2. In the illustrated embodiment, the blank 20 can include a top panel 15 foldably connected to a first side panel 17 at a first lateral fold line 19. A bottom panel 21 can be foldably connected to the first side panel 17 at a second lateral fold line 23. A second side panel 25 can be foldably connected to the bottom panel 21 at a third lateral fold line 27. In the illustrated embodiment, the blank 20 includes an attachment flap 29 foldably connected to the top panel 15 at a fourth lateral fold line 31. Any of the top and bottom panels 15, 21, the first and second side panels 17, 25, and the attachment flap 29 can be otherwise shaped, arranged, configured, or omitted, without departing from the disclosure.

The top panel 15 can be foldably connected to a first top end flap 33 and a second top end flap 35. The first side panel 17 can be foldably connected to a first side end flap 37 and a second side end flap 39. The bottom panel 21 can be foldably connected to a first bottom end flap 41 and a second bottom end flap 43. The second side panel 25 can be foldably connected to a first side end flap 45 and a second side end flap 47. When the carton is erected, the top and bottom end flaps 33 and 41 and side end flaps 37 and 45 can close a first end of the carton, and the top and bottom end flaps 35 and 43 and side end flaps 39 and 47 can close a second end of the carton. In accordance with an alternative embodiment of the present disclosure, different flap arrangements can be used for at least partially closing the ends of the carton.

In one embodiment, the top and bottom end flaps 33, 41 and side end flaps 37, 45 extend along a first marginal area of the blank 20, and are foldably connected to the respective panels 15, 21, 17, 25 at respective portions of a first longitudinal fold line 62 that extends along the length of the blank 20. In the illustrated embodiment, the top and bottom end flaps 35, 43 and side end flaps 39, 47 extend along a second marginal area of the blank 20, and are foldably connected to the respective panels 15, 21, 17, 25 at respective portions of a second longitudinal fold line 64 that also extends along the length of the blank 20. The longitudinal fold lines 62, 64 may be, for example, substantially straight, or offset at one or more locations to account for blank thickness or for other factors.

It will be understood that the blank 20 and the carton formed therefrom can have a different arrangement without departing from the disclosure. The blank 20 and carton formed therefrom can also include one or more additional or alternative features, e.g., handle features, dispenser features, article protection features, etc., to suit a particular application.

Figure 3:
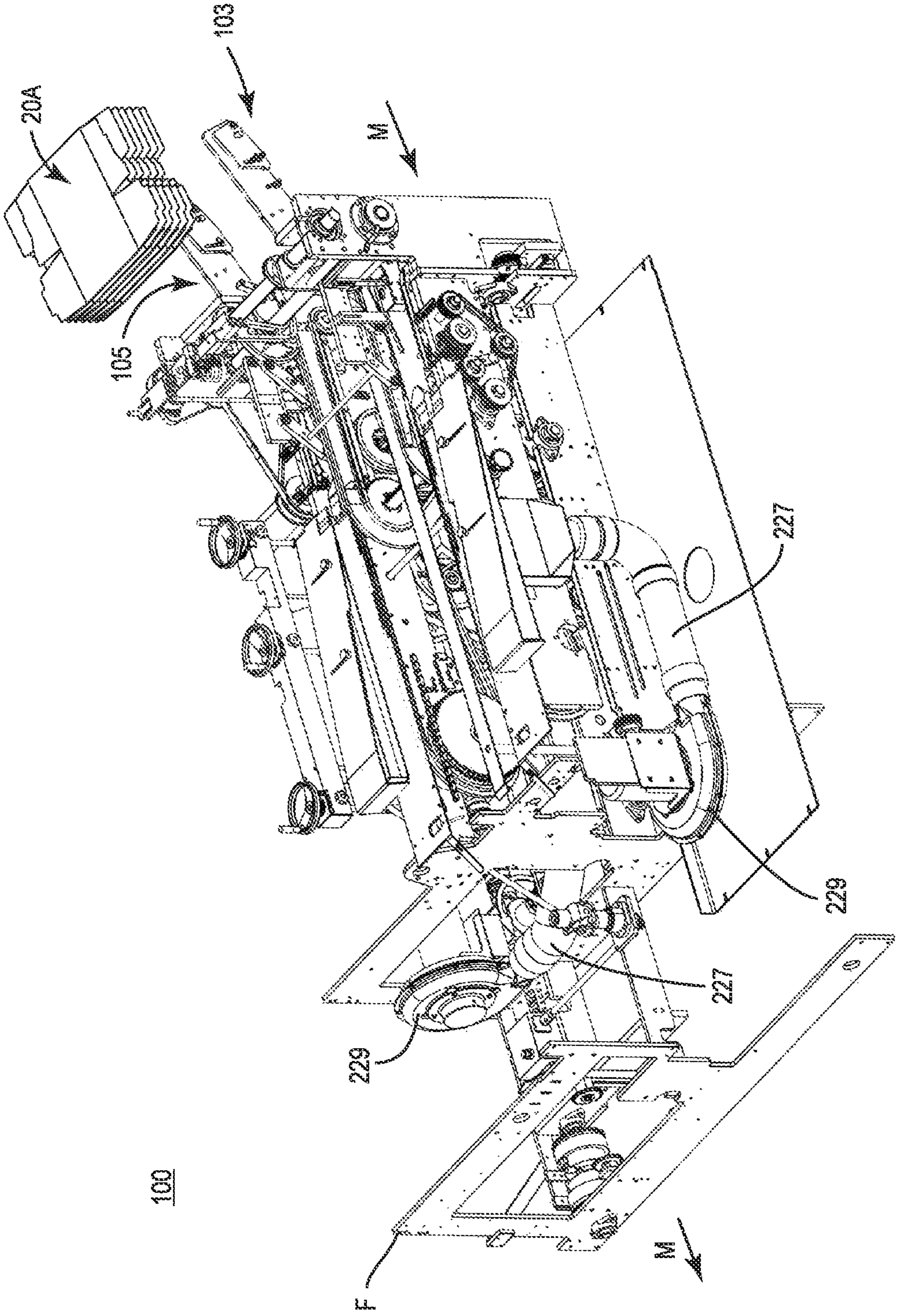
FIG. 3 is another perspective view of the system of FIG. 2.

With additional reference to FIGS. 2 and 3, the method and system 100 can include a machine frame F supporting the various assemblies and components thereof described herein. The machine frame F can include one or more of bases, legs, struts, tie bars, platforms, etc., in various arrangements, to provide a supporting structure for the assemblies and components described herein. For example, the machine frame F can support such components above a base surface such as a ground or floor, and can provide access at one or more locations for human operators, e.g., to inspect, maintain, and/or otherwise operate the system 100.

Figure 4:
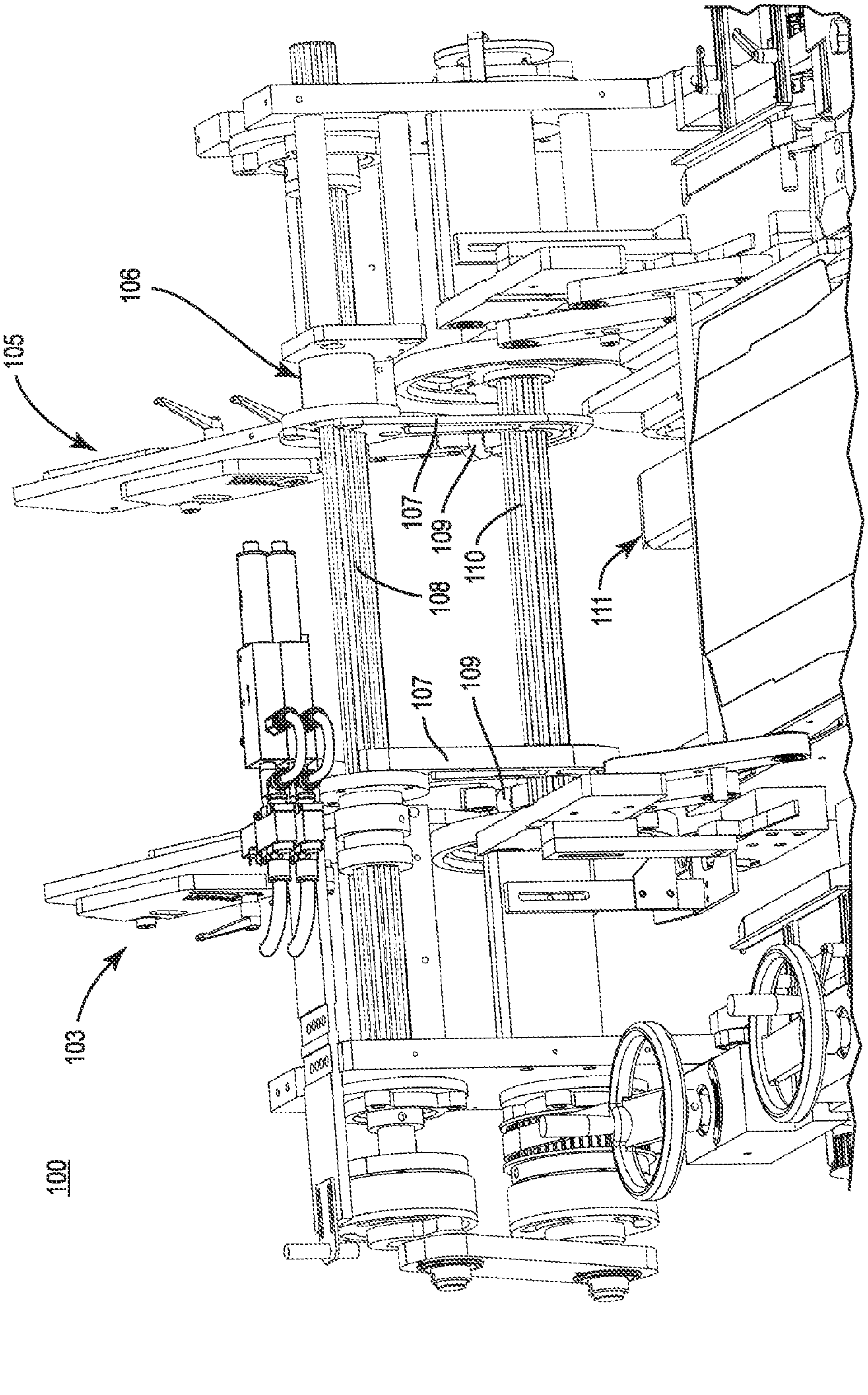
FIG. 4 is an enlarged perspective view of a blank infeed assembly of the system of FIG. 2.
Figure 5:
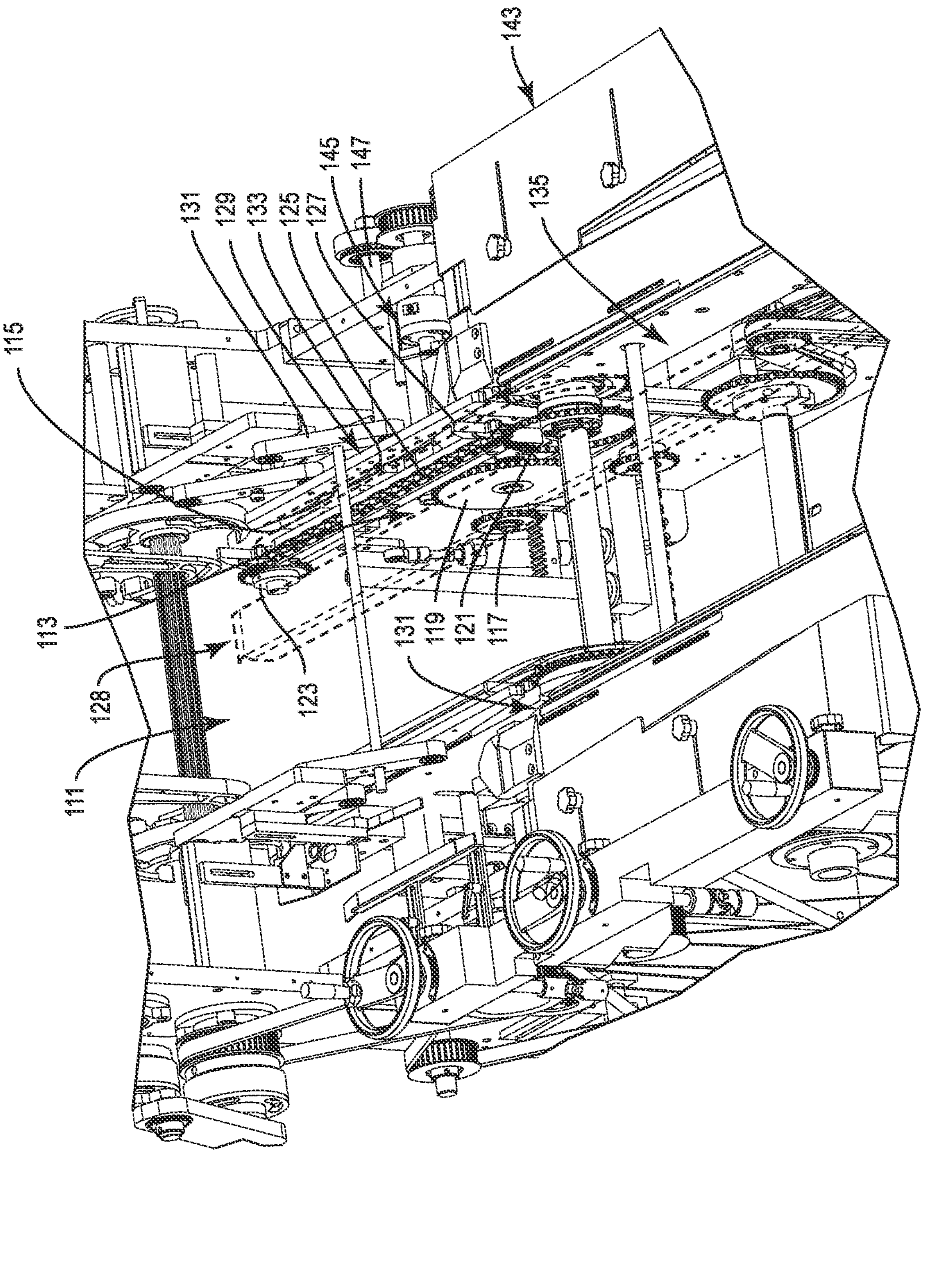
FIG. 5 is an enlarged perspective view of a conveyor assembly of the system of FIG. 2.

Referring additionally to FIGS. 4 and 5, the system 100 can include a blank infeed assembly 103 having a magazine 105 defining an interior space for receiving one or more folded or collapsed cartons/blanks 20A. As shown, the magazine 105 can be shaped and arranged to support multiple cartons/blanks 20A in a horizontally stacked arrangement. It will be understood that the magazine 105 can include one or more features for advancing the cartons/blanks 20A forward through the magazine, e.g., pushers, hoppers, other actuators, etc.

Positioned downstream of the magazine 105, e.g., in a downstream direction or machine direction M along which the cartons/blanks 20A move in the course of operation of the system 100 as described herein, a pick-and-place-style blank feeder apparatus 106, e.g., a pick-and-place style blank feeder, can be provided. In the illustrated embodiment, a pair of carton engagement arms 107 can be pivotably/rotatably mounted on an overhead support 108, e.g., a rod, bar, shaft, etc. Each carton engagement arm 107, as shown, can include a respective vacuum cup 109 mounted on a distal end portion thereof. In this regard, in the course of operation of the system 100, the carton engagement arms 107 can be actuated to position the respective vacuum cups 109 to engage a carton 20A in the magazine 105 and a vacuum can be applied to the vacuum cups 109 (e.g., via a hose or other fluid line) so that the vacuum cups 109 are configured to acquire the cartons/blanks 20A through suction.

Accordingly, and as described further herein, the carton engagement arms 107 can rotate or pivot about/with the overhead support 109 to move a respective carton 20A generally in the machine direction M and onto a conveyor assembly 111. In the illustrated embodiment, a stop member 110 or other limiter can be supported upstream of the carton engagement arms 107 to minimize, inhibit, and/or prevent rearward movement of the carton engagement arms 107 past a preselected position at which the stop member 110 is positioned.

The conveyor assembly 111 can include a pair of first conveyor members 113 mounted to the machine frame F in spaced apart and generally parallel relation with respect to the machine direction M. Each conveyor member 113, as shown, includes an upper surface defining a respective rail 115 for supporting the cartons/blanks 20A received from the blank infeed assembly 103. As also shown, one or more sprockets 117, 119, 121 can be rotatably mounted to the respective conveyor members 113, e.g., via a shaft, bearing, spindle, rod, etc. A pair of respective endless belts or chains 125 can be at least partially wrapped about or otherwise positioned in generally curved engagement with the sprockets 117, 119, 121 such that upon rotation of the sprockets 117, 119, 121 as described further herein, the chains 125 move along respective generally closed paths.

As also shown, a series of upstanding carton engagement lugs 127 are coupled at spaced intervals along the length of the respective chains 125 such that, along an upper portion of the closed paths of the chains 125, the lugs 127 protrude upwardly above the respective conveyor members 113. In this regard, the engagement lugs 127 are configured to move in synchronization with the chains 125. As described further herein, as the chains 125 are driven to move about the sprockets 117, 119, 121, the lugs 127 can be carried into engagement with a trailing portion of the respective cartons/blanks 20A to move, e.g., frictionally slide, a lower surface of the blanks/cartons 20 along the support plates 113.

In the illustrated embodiment, a central plate 128 can be supported on the machine frame F and positioned between and in generally parallel relation with the rails 115 for at least partially supporting cartons/blanks 20A, for example, a central portion of larger cartons/blanks 20A. It will be understood that the central plate 128 can be omitted from the system 100 without departing from the disclosure.

A pair of carton braces 129 can be attached to the machine frame F, for example, with struts 131 or other attachment members, and can include one or more spaced apart downward extensions 133 that provide a stop or upper limit of movement for cartons/blanks 20A traveling along the conveyor assembly 111. In this regard, the carton braces 129 can be positioned above the conveyor members 113 to maintain/stabilize a vertical position of the cartons/blanks 20A moving along the system 100.

The conveyor assembly 111 can also include a pair of second conveyor members 135 positioned downstream from the first conveyor members 113, and a second pair of endless belts or chains 125 that are at least partially wrapped or otherwise in generally curved engagement with one or more sprockets rotatably mounted to the conveyor members 135 such that, upon rotation of the sprockets, as described further herein, the chains 125 move along respective second generally closed paths. In the illustrated embodiment, the sprockets can include sprockets 137, 139, 141, as well as the sprocket 121 associated with the first conveyor members 131, though a different arrangement of sprockets or rotatable members could be provided without departing from the disclosure. It will be understood that one or more carton engagement lugs can be coupled to the chains 125 associated with the respective second conveyor members 135 in the manner described above with regard to the first conveyor members 113, e.g., for engaging cartons downstream of the first conveyor members 113.

While the conveyor assembly 111 is illustrated as having a pair of adjacent/overlapping conveyor members and associated chains, it will be understood that the conveyor assembly 111 can be provided in a different arrangement without departing from the disclosure.

A carton erection assembly 143 can be positioned at least partially along the conveyor assembly 111, and can include an end flap engagement assembly or rotational end flap engagement assembly 145 coupled to a driven shaft 147. In this regard, and as described further herein, the end flap engagement assembly 145 can be rotatably mounted to the system 100 for engaging a portion of the cartons/blanks 20A.

Figure 6:
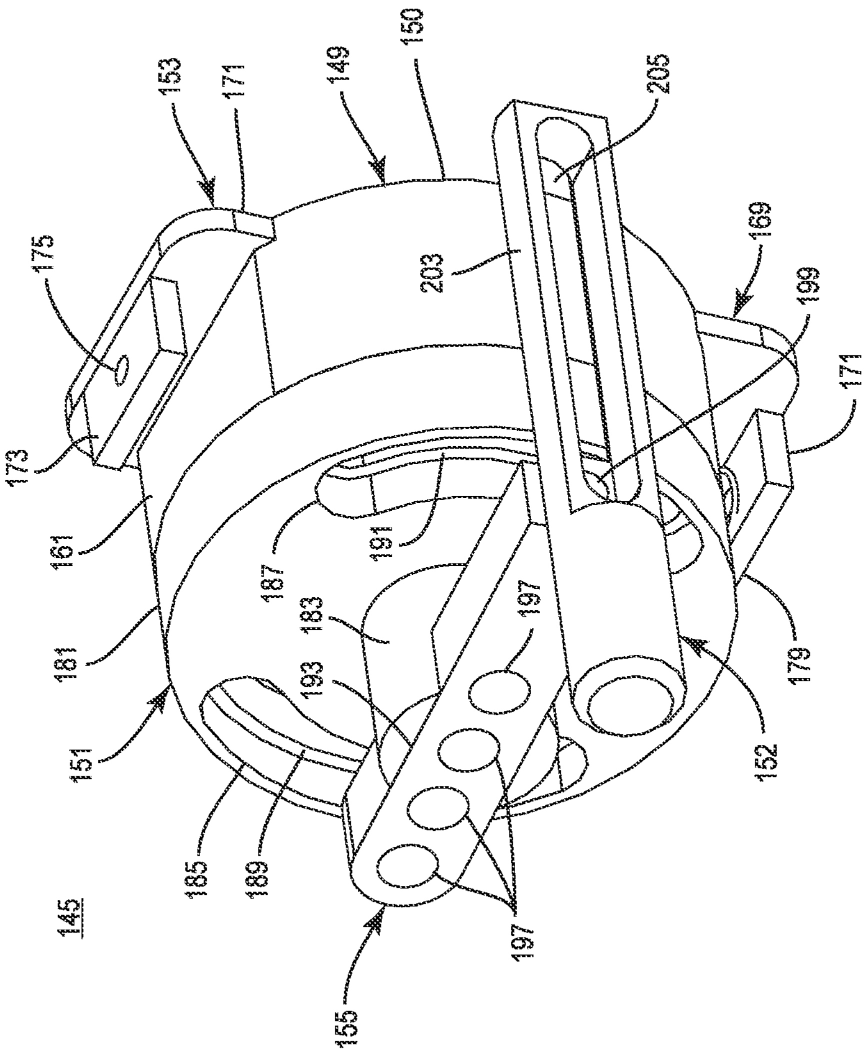
FIG. 6 is a perspective view of an end flap engagement assembly of the system of FIG. 1.
Figure 7:
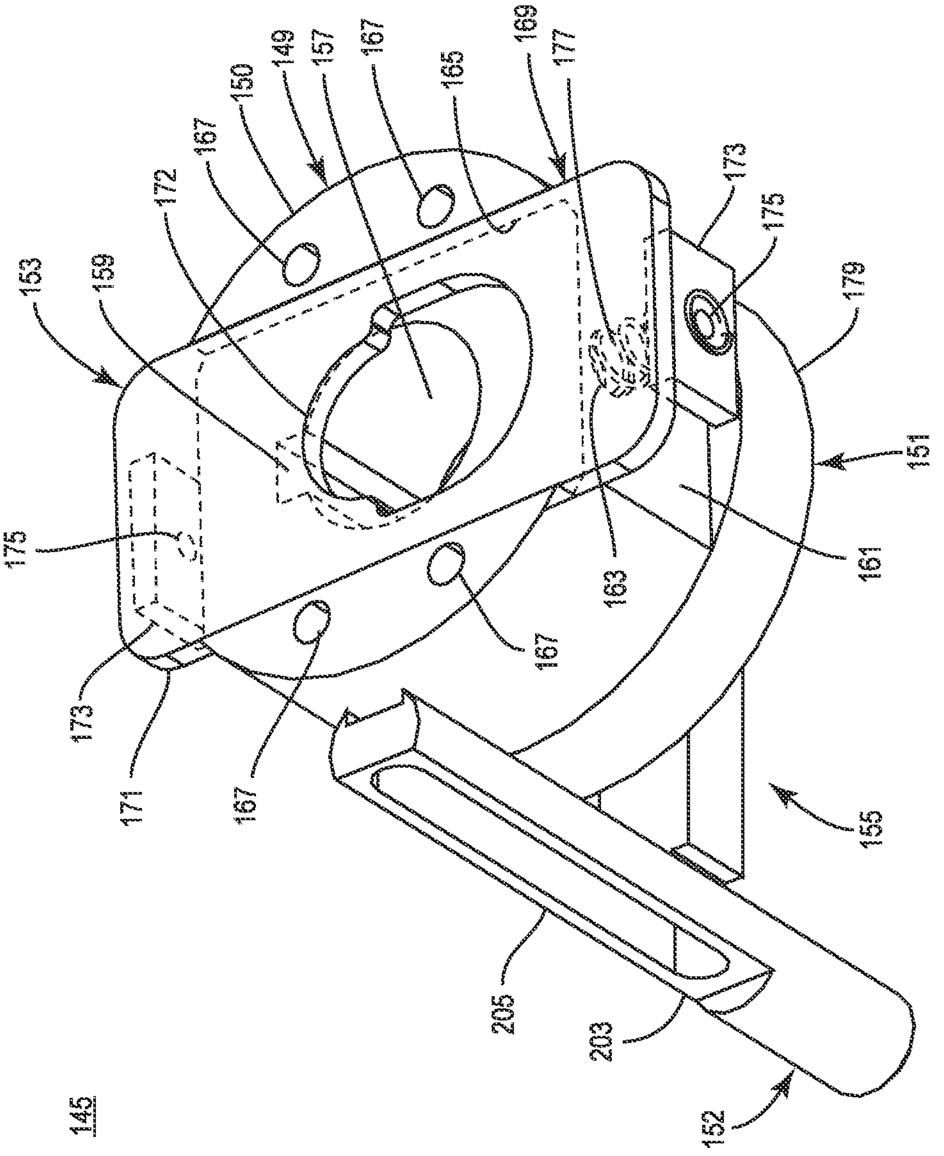
FIG. 7 is another perspective view of the end flap engagement assembly of FIG. 6.

With additional reference to FIGS. 6 and 7, the rotational end flap engagement assembly 145 can include a hub member 149 coupled to a hub adapter 151. As also shown, a clamping apparatus 153 can be operably coupled with the hub member 149, and an end flap engagement lug 152 can be mounted on an arm 155 coupled to the hub adapter 151 such that the end flap engagement lug 152 extends from the hub member 149.

As shown, the hub member 149 can have a generally cylindrical body 150 defining an interior recess 157 for at least partially receiving the shaft 147, and along which a keyway or channel 159 is formed, e.g., for receiving a key or other member for coupling the hub member 149 and the shaft 147. In one embodiment, the shaft 147 can include one or more protruding portions sized and configured to be at least partially received in the channel 159 to provide a secure coupling of the hub member 149 and the shaft 147. The body 150 of the hub member 149 can also have a pair of diametrically opposed flat or chamfered surfaces 161, one or both of which defining a respective recess or bore 163 for engaging the clamping apparatus 153, as described further herein.

In the illustrated embodiment, the hub member 149 can also define a recessed track 165 for receiving a portion of the clamping apparatus 153. In addition, the cylindrical body 150 of the hub member 149 can one or more apertures 167 along a peripheral region thereof in generally parallel relation with the interior recess 157 for at least partially receiving respective fasteners therethrough.

The clamping apparatus 153 can include a body 169 having a central portion 171 defining a shaft opening 172, and a pair of flanges 173 extending away from the central portion 171 at opposite ends thereof, one or both of which defining a respective opening 175 or other engagement feature for engaging/supporting a biasing member 177, such as a coiled spring or other biasing member. As shown, upon assembly, the central portion 171 of the clamping apparatus 153 can be at least partially slidably received in the track 165 of the hub member 149 such that the flanges 173 are positioned with surfaces facing and selectively movable toward and away from the respective chamfered surfaces 161 of the hub member 149. The biasing member 177 can be at least partially engaged with the opening/engagement feature 175 of a respective flange 173 and extend at least partially into a respective bore 163 such that the biasing member 177 biases the flange 173 a generally preselected distance from the chamfered surface 161 of the hub member 149. Accordingly, one or more portions of the body 169 of the clamping apparatus, e.g., one or more edges of the shaft opening 172, can be biased toward a preselected position relative to the interior recess 157 of the hub member 149 via the biasing member 177.

In this regard, when a shaft 147 is at least partially inserted through the shaft opening 172 of the clamping member 153 and into the interior recess 157 of the hub member 149, an edge of the central portion 171 of the clamping apparatus 153 surrounding the shaft opening 172 can maintain/apply a compressive force, e.g., a clamping force, on the shaft 147 via the presence/action of the biasing member 177. In this regard, the biasing member 177 can be configured, e.g., selected with a corresponding length, spring constant, etc. to provide a suitable clamping force on the shaft 147 when the shaft 147 is inserted into the hub member 149 to provide/maintain a secure coupling between the rotational end flap engagement assembly 145 and the shaft 147. While the rotational end flap engagement assembly 145 is shown with one biasing member 177, it will be understood that a biasing member 177 can be provided between each flange 173 and each respective chamfered surface 161.

Still referring to FIGS. 6 and 7, the hub adapter 151 can have a body 179 with a base portion 181 in at least partial face-to-face contact with the hub member 149, and with a protruding portion 183 extending therefrom. The base portion 181 can include a pair of opposed generally arcuate slots 185, 187 each having a respective arcuate step 189, 191 formed therealong and such that portions of the hub member 149 are exposed through the slots 185, 187. In the illustrated embodiment, the slots 185, 187 can be positioned in alignment with the apertures 167 in the hub member 149 to provide access thereto. In this regard, the hub adapter 151 can be selectively oriented at a desired rotational orientation with regard to the hub member 149 and coupled/secured thereto, for example, by inserting one or more fasteners, e.g., a screw, bolt, pin, rivet, etc. through the respective slots 185, 187 in the hub adapter 151 and into the respective apertures 167 in the hub member 149. In one embodiment, the apertures 167 in the hub member 149 can be threaded or otherwise provided with surface features to engage a fastener, for example, of a type having a head and a shank, and which can be inserted at least partially into the respective apertures 167 such that the head engages a respective step 189, 191 to couple the hub adapter 151 to the hub member 149.

As also shown, the protruding portion 183 of the body 179 of the hub adapter 151 can define a track 193 and a bore extending downwardly therethrough. In one embodiment, the bore can be threaded or otherwise provided with surface features to engage a fastener at least partially therealong.

In the illustrated embodiment, the arm 155 can be at least partially slidably inserted in the track 193 so as to be movably coupled/selectively positionable therealong. As shown, the arm 155 is a generally elongate member defining a plurality of openings 197 along a length thereof, and a distal end portion 199 defining a bore extending at least partially therethrough. In this regard, the arm 155 is selectively positionable with regard to the hub adapter 151, and a desired placement of the arm 155 can be secured, in one example, by aligning a respective opening 197 in the arm 155 with the bore 195 and inserting a fastener such as a screw, bolt, pin, rivet, etc. through the respective opening 197 into the bore.

The end flap engagement lug 152, as shown, can be a generally elongate member with a body 203 having a slot 205 formed along a portion of the length thereof. In this regard, the end flap engagement lug 152 can be movably coupled/selectively positioned relative to the arm 155 and secured in such position by inserting a fastener through the slot 205 into a bore 199 at a distal end portion 199 of the arm 155. In this regard, the bore 199 at the distal end portion of the arm 155 can be threaded or otherwise provided with surface features to engage a fastener, for example, of a type having a head and a shank, and which can be inserted at least partially into the bore such that the head engages a portion of the body 203 of the end flap engagement lug 152 surrounding the slot 205 to couple the end flap engagement lug 152 to the arm 155.

Figure 8:
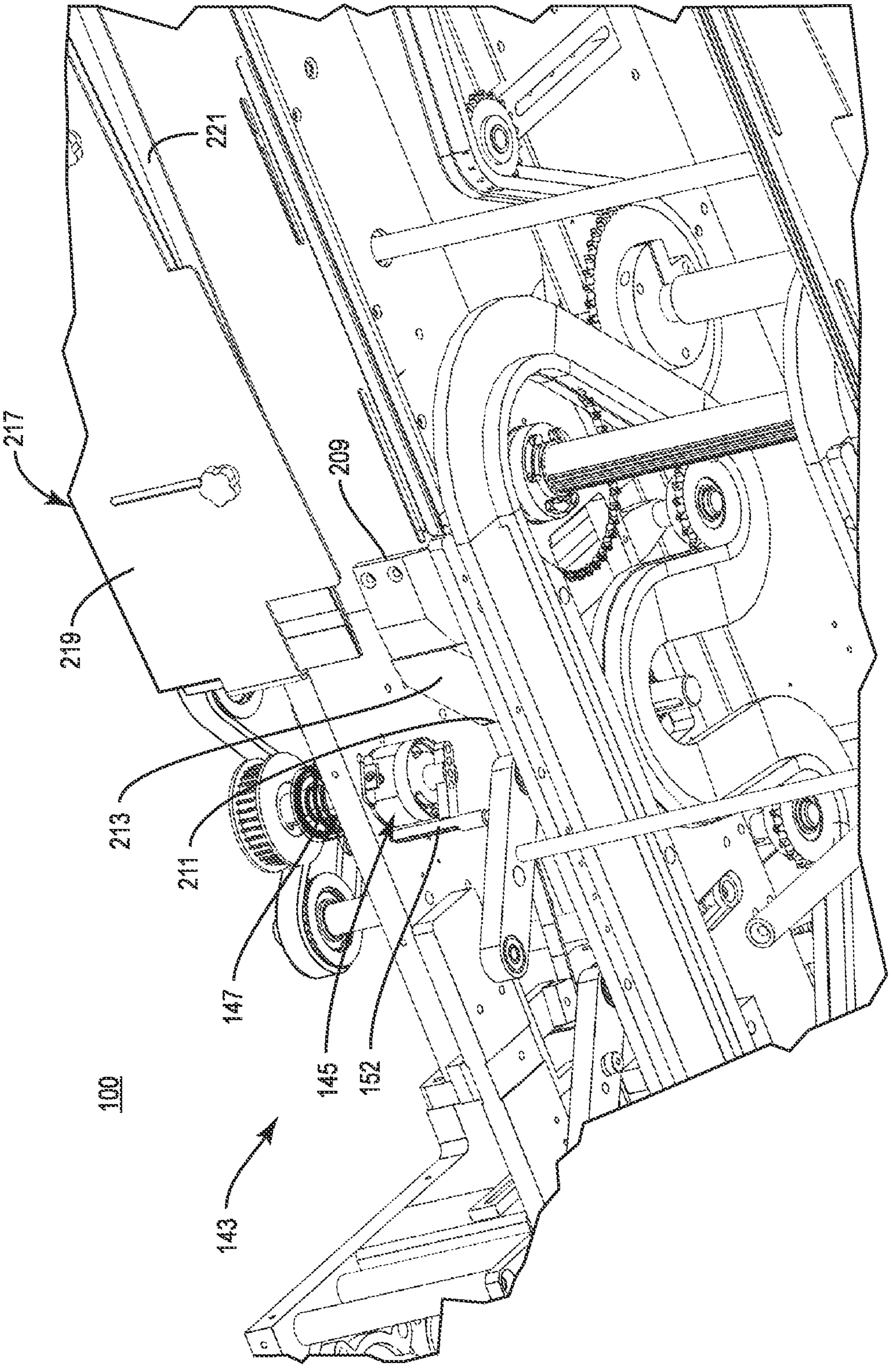
FIG. 8 is an enlarged perspective view of a carton erection assembly of the system of FIG. 2.
Figure 9:
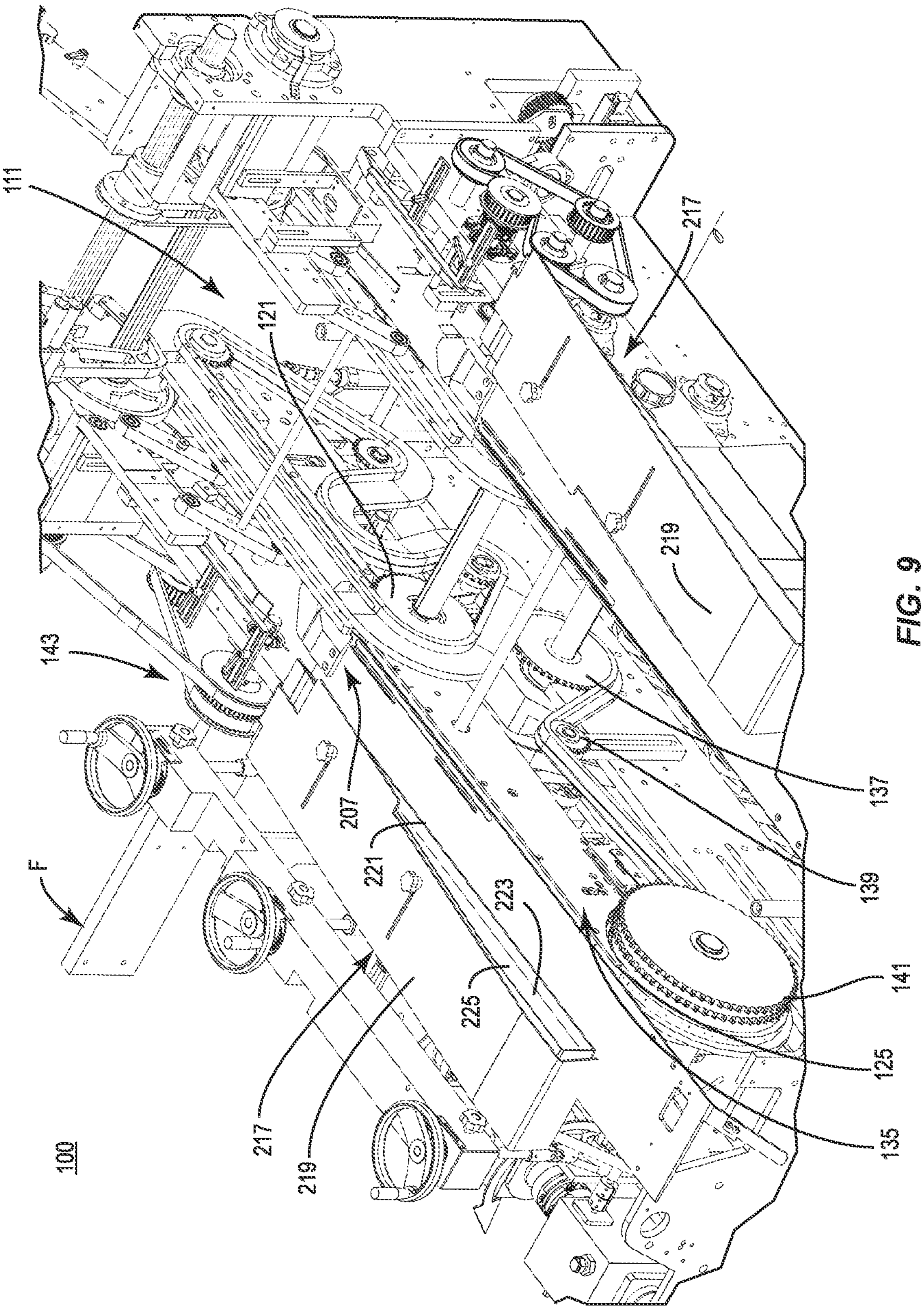
FIG. 9 is an enlarged perspective view of a downstream portion of the system of FIG. 2.
Figure 10:
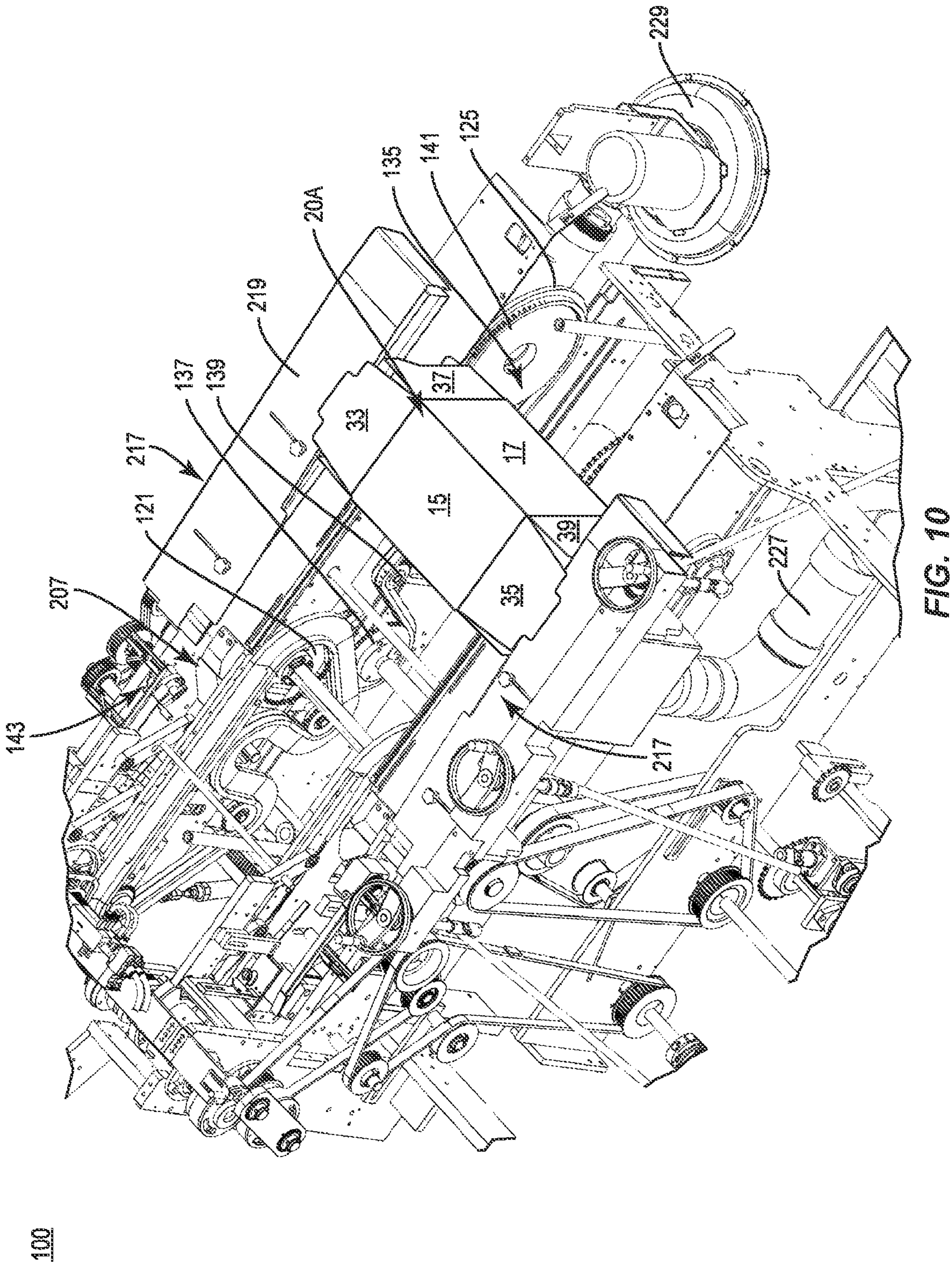
FIG. 10 is another enlarged perspective view of a downstream portion of the system of FIG. 2.
Figure 11A:
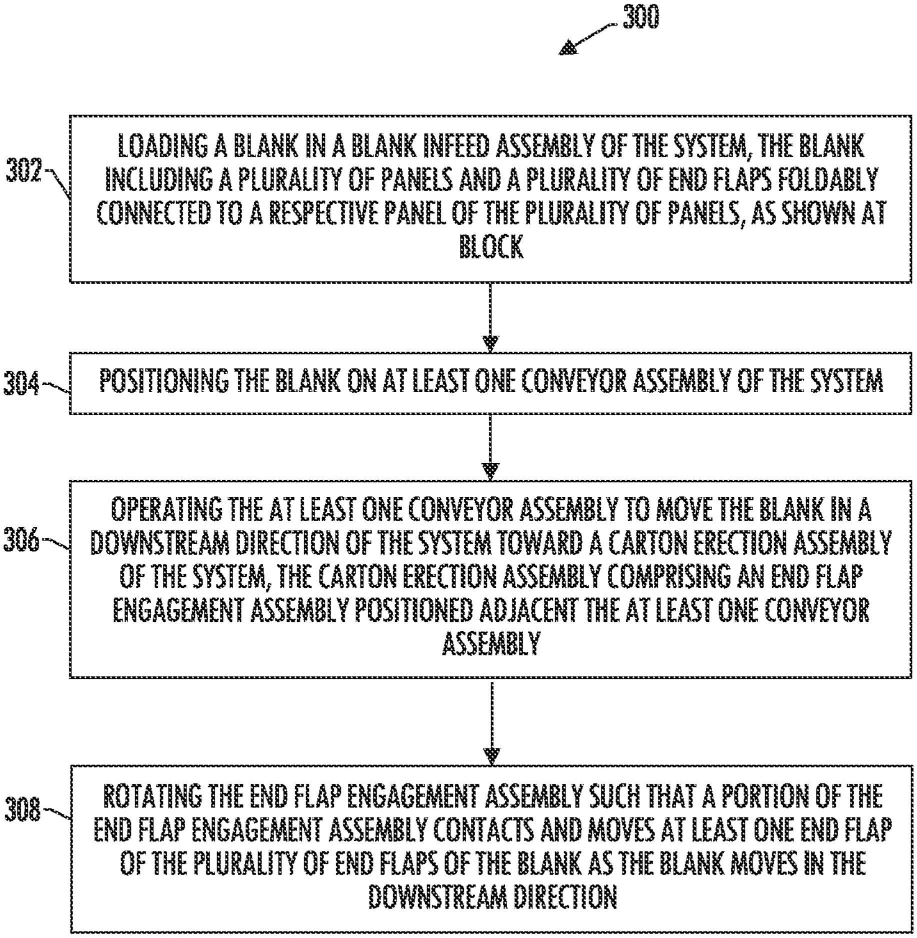
FIGS. 11A-11F are flowcharts illustrating various operations in a method of at least partially forming a carton according to exemplary embodiments of the disclosure.
Figure 11B:
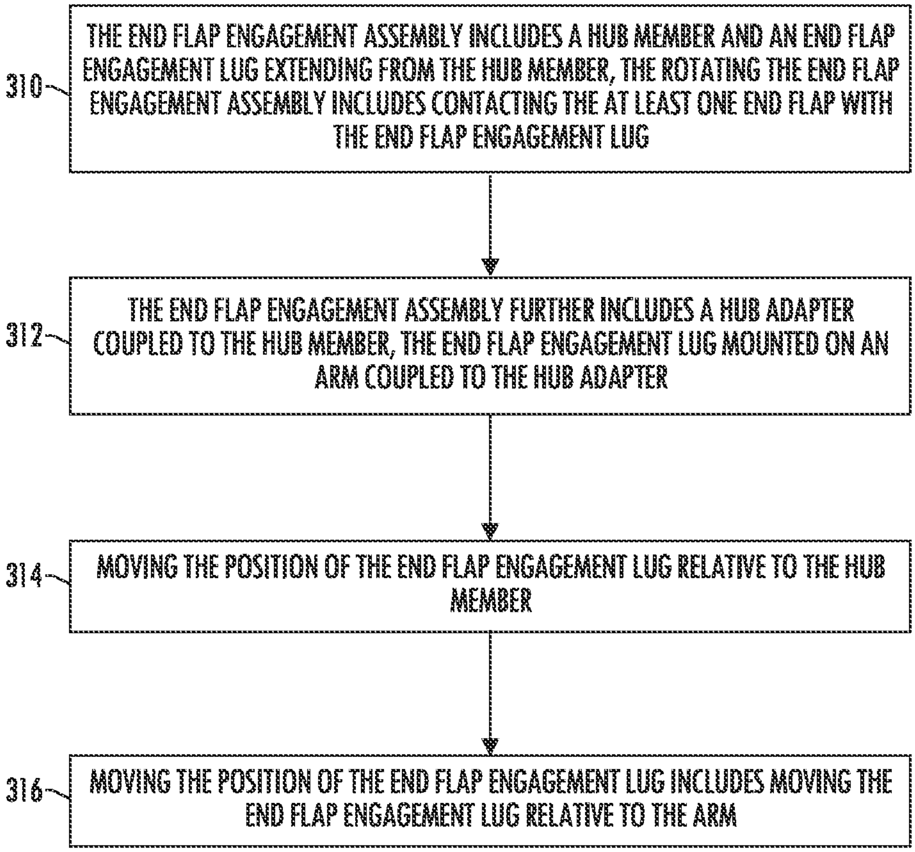
Figure 11C:
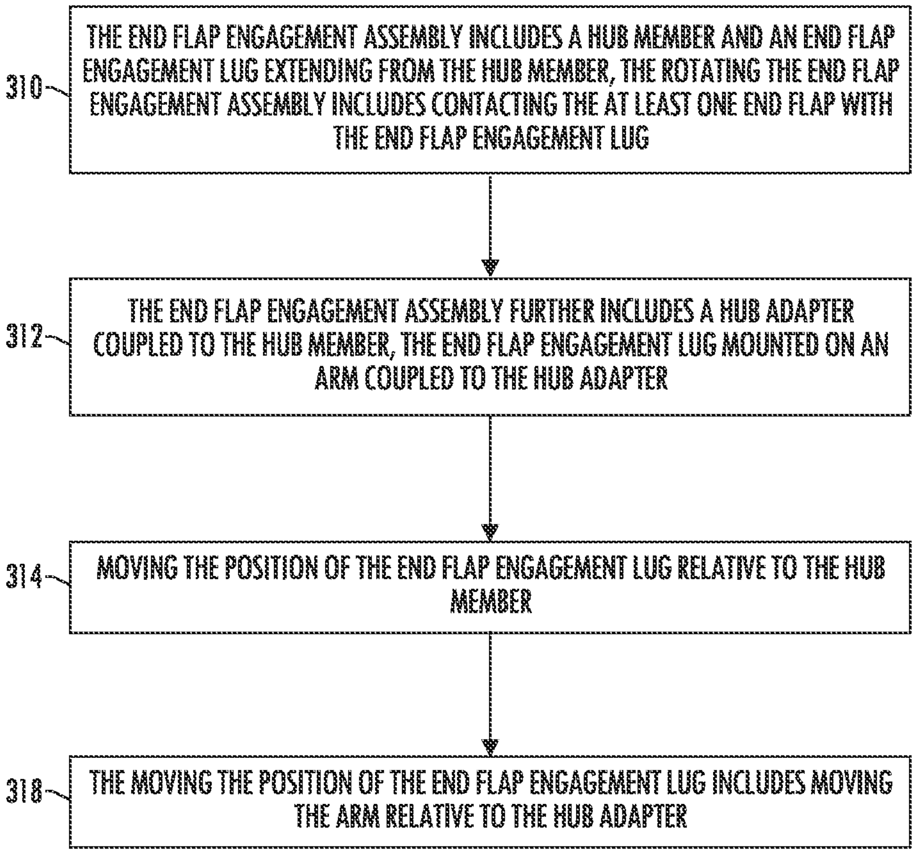
Figure 11D:
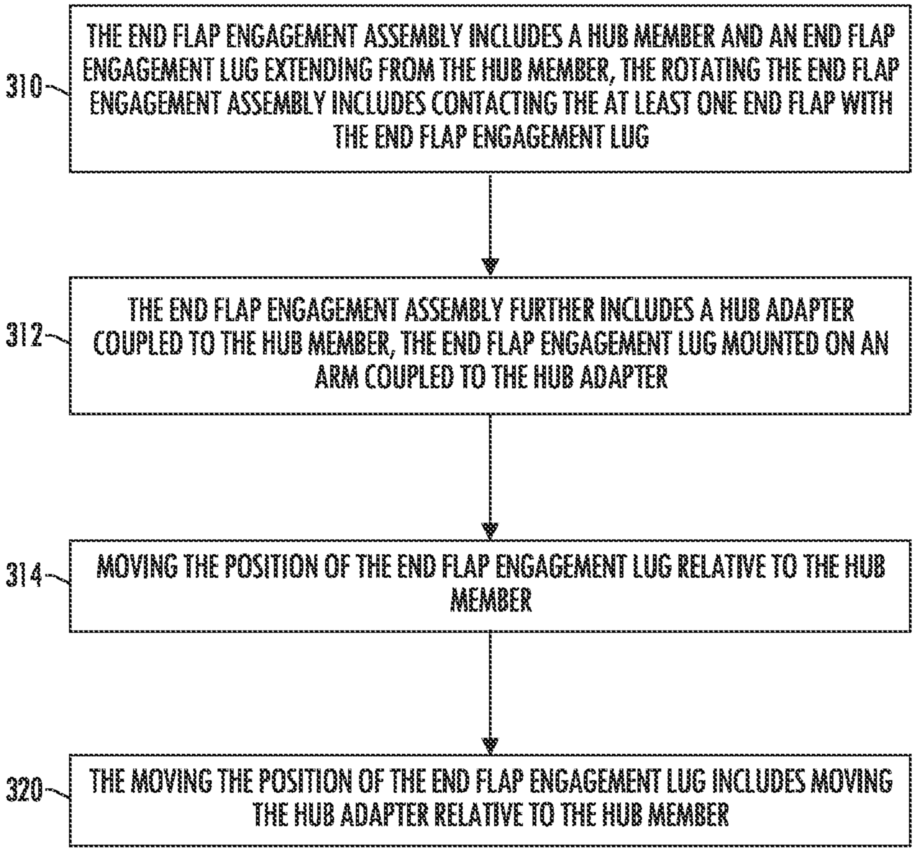
Figure 11E:
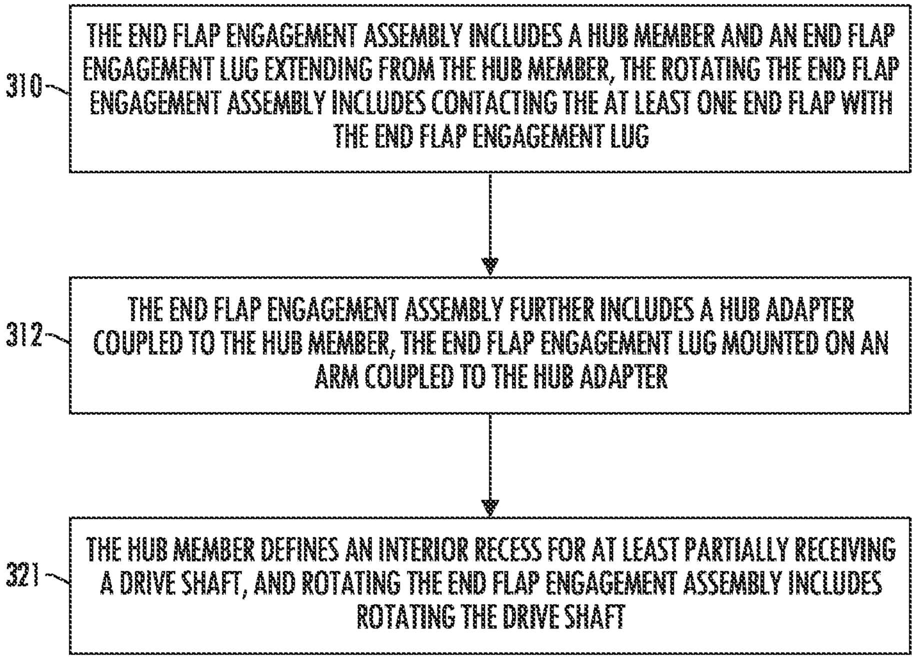
Figure 11F:
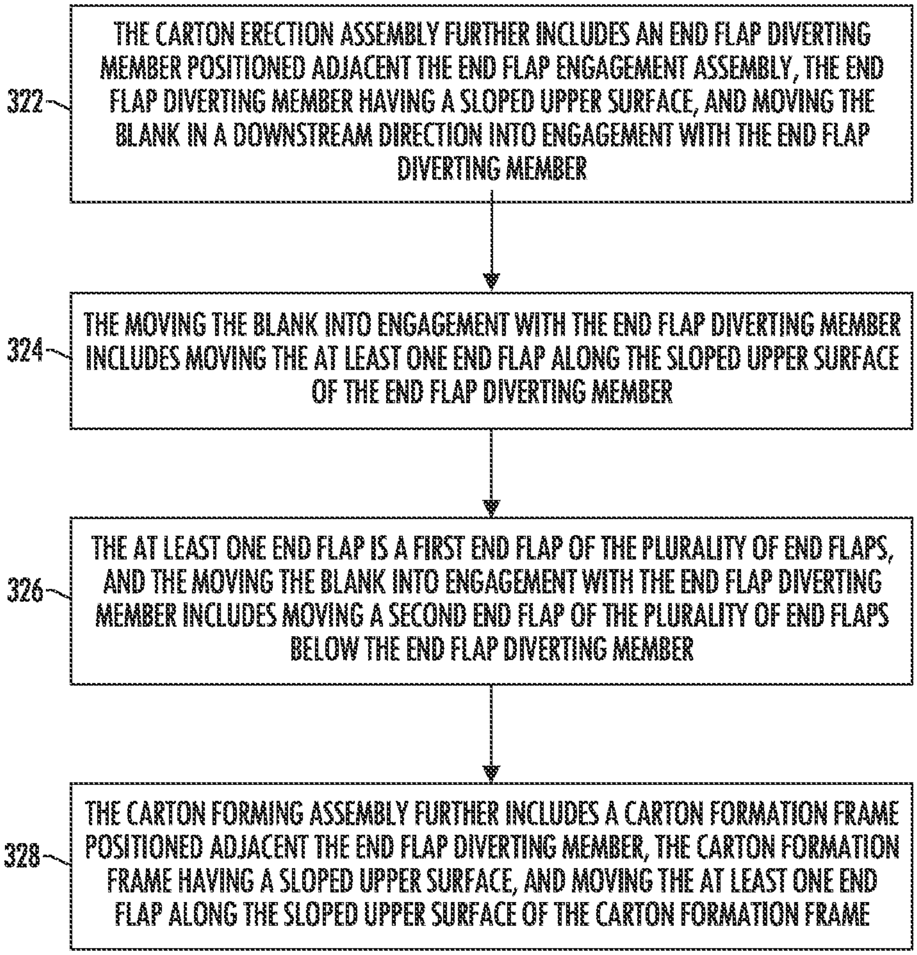

With additional reference to FIGS. 8-10, the rotational end flap engagement assembly 145 can be assembled and coupled to a drive shaft 147 such that, upon rotation of the drive shaft 147, as described further herein, the rotational end flap engagement assembly 145 rotates with the drive shaft 147, with the end flap engagement lug 152 positioned in a radial outermost position relative to the shaft 147.

Furthermore, the rotational end flap engagement assembly 145 has a generally reconfigurable construction, with the hub adapter 151, the arm 155, and the end flap engagement lug 152 each selectively repositionably from an initial position/to a selected position to provide for wide adaptability to different applications. For example, such a construction of the end flap engagement assembly 145 can provide for moving the position of the end flap engagement lug 152 relative to the hub member 149 by moving the end flap engagement lug 152 relative to the arm 155, moving the arm 155 relative to the hub adapter 151, and/or moving the hub adapter 151 relative to the hub member 149.

Such configuration of the rotational end flap engagement assembly 145 is at least partially modular so that one or more components thereof can be substituted for a corresponding component of a selected size/configuration to suit a particular application. In one embodiment, the entire rotational end flap engagement assembly 145 is separably connected to the shaft 147, e.g., such that a replacement or a differently-configured rotational end flap engagement assembly can then be applied to the shaft, e.g., to engage a different carton configuration.

It will be understood that while the system 100 is illustrated with one rotational end flap engagement assembly 145 coupled to a drive shaft 147 for clarity of illustration, and that a second rotational end flap engagement assembly 145 can be coupled to an opposing drive shaft 147 in various embodiments.

In this regard, each rotational end flap engagement assembly 145 can be attached to the respective drive shaft 147 so as to be positioned upstream of a respective end flap diverting member 207 of the carton erection assembly 143, and as described further herein, is operable to selectively position end flaps of the cartons/blanks 20A relative to the end flap diverting member 207. Each end flap diverting member 207, as shown, has a body 209 with a generally curved or blunted forward nose portion 211 positioned facing the rotational end flap engagement assembly 145 and intersecting a sloped upper surface 213. The sloped upper surface 213 of the end flap diverting member 207 can include one or more angled, oblique, stepped, etc., surfaces for slidably engaging a portion of the blanks/cartons 20A, as described further herein.

Each end flap diverting member 207 can be positioned proximate and below a respective carton formation frame 217 having a sloped upper surface 219 for slidably engaging a portion of the blanks 20A, as described further herein. The upper surface 219 of the carton formation frame 217 slopes upwardly from a generally level lower portion 221 such that an airflow discharge area 223 is defined therebetween. In this regard, an opening can be provided in the lower portion 221 of each carton formation frame 217 and in fluid communication with a respective conduit 227, e.g., tube, hose, channel, etc. that is fluidly coupled to a respective blower apparatus 229.

The blower apparatus 229 can be a fluid driver that is operable to direct moving air through the conduit 227, out the opening 227, and into the airflow discharge area 223 to facilitate erection of the cartons/blanks 20A, as described further herein. In this regard, the blower apparatus 229 can be a fan, pump, or other fluid driver driven by, for example, an engine, motor, or other actuator to selectively provide airflow to the airflow discharge area 223.

At least some of the aforementioned components of the system 100 described above can be driven by rotatable shafts, axels, etc., which can be driven to rotate by a drive assembly 231. In the illustrated embodiment, the drive assembly 231 can include a series of interconnecting shafts 233, gearboxes 235, 237, and associated couplings, and can be operably coupled to the various assemblies of the system 100 described herein, in one embodiment, by a transmission assembly 239. In this regard, upon rotation of an input shaft, e.g., by a motor, engine, etc., the drive assembly 231 can operate to provide torque and rotational movement to various shafts, axels, gears, pulleys, sprockets, etc., of the transmission assembly 239 to operate the system 100. It will be understood that, in some embodiments, separate motors, engines, actuators (e.g., pneumatic or hydraulic actuators), etc., can be employed to drive one or more components of the system 100.

Operation of the system 100 to erect cartons/blanks 20A, according to one exemplary embodiment of the disclosure, can include placing a vacuum source in fluid communication with the vacuum cups 109 of the blank feeder apparatus 106 to cause the vacuum cups 109 to engage a forward carton 20A in the magazine 105. It will be understood that such placement of the forward carton 20A can be accomplished by an actuator and/or human operator.

Upon activation of the drive assembly 131, the overhead support 109 of the blank feeder apparatus 106 can be rotated or pivoted to cause the carton engagement arms 107 attached thereto to move at least partially forwardly in the machine direction M, and orient the carton 20A in a generally face up or face down orientation on the conveyor assembly 111. In particular, the folded carton 20A can be provided in a folded configuration supported on respective portions of the rails 115 of the respective conveyor members 113 and the central support plate 128. In such a position the end flaps 33, 35, 37, 39, 41, 43, 45, 47 can be positioned at outermost positions relative to the central support plate 128.

Continued operation of the drive assembly 231 causes the sprockets 117, 119, 121, 123 to rotate and engage the respective chains 125, with upper portions of the chains 125 moving in the machine direction M. One or more of the lugs 127 carried on the respective chains 125 can engage a rear edge of the carton 20A to slidably advance the carton 20A along the rails 20A and central support plate 128.

The drive assembly 231 also causes the rotational end flap engagement assemblies 145 to rotate such that an upper path of rotation of the end flap engagement assemblies 145 is generally toward the machine direction M and a lower path of rotation of the end flap engagement assemblies 145 is generally reversed against the machine direction M. Accordingly, as the end flap engagement assemblies 145 rotate with the drive shafts 147, the respective end flap engagement lugs 152 are carried on the respective arms 155 and timed to impact, knock, deflect or otherwise move the respective top end flaps 33, 35 (broadly, "first end flap") in an upward direction and to impact, knock, or otherwise deflect the respective bottom end flaps 41, 43 (broadly, "second end flap") in a downward direction.

In this regard, as the carton 20A continues in the machine direction M, the top end flaps 33, 35 are deflected upwardly by the respective rotational end flap engagement assemblies 145 to engage the respective end flap diverting members 207 at respective nose portions 211 and/or upper sloped portions 213 to be guided toward the sloped upper surfaces 219 of the respective carton formation frames 217.

Meanwhile, the bottom end flaps 41, 43, having been deflected downwardly by the respective rotational end flap engagement assemblies 145, are positioned to engage or be supported proximate upper surfaces of the respective second conveyor members 135. As the carton 20A continues to advance in the machine direction M, the sliding engagement of the top end flaps 33, 35 with the upper sloped surfaces 219 of the respective carton formation frames 217 causes the carton 20A to at least partially open, e.g., such that the top panel and the bottom panel increasingly space apart from one another. Such opening/erection of the carton 20A can be facilitated by airflow generated by the respective blower apparatuses 229 and exiting the respective airflow discharge areas 223 toward an interior of the carton 20A.

Following the at least partial erection of the carton 20A described above, the carton 20A can be moved to another system or to a further downstream portion of the system 100, for example, for loading with containers, formations of closed ends of the carton 20A, transport, storage, etc.

In view of the foregoing, the rotational end flap engagement assembly 145 provides an easily reconfigurable and/or replaceable component of the system that can facilitate adjustment of the system 100 to form cartons of different configurations, e.g., sizes, shapes, end flap configurations, etc. Furthermore, the rotational end flap engagement assembly 145 is directly coupled to a shaft 147 driven by the drive assembly 231 via the transmission assembly 239, e.g., such that the rotational end flap engagement assembly 145 can be rotatably driven by a drive assembly 231 common to at least one of the blank infeed assembly 103, the conveyor assembly 111, and/or the carton erection assembly 143, e.g., so as to obviate a need for a separate actuator, e.g., pneumatics, hydraulics, etc., to drive the rotational end flap engagement assembly 145 separately from such other components of the system 100.

FIGS. 11A-11F are flowcharts illustrating various steps in a method 300 of at least partially erecting a carton with a carton forming system. The method includes loading a blank in a blank infeed assembly of the system, the blank including a plurality of panels and a plurality of end flaps foldably connected to a respective panel of the plurality of panels, as shown at block 302. The method further includes positioning the blank on at least one conveyor assembly of the system, as shown at block 304. The method further includes operating the at least one conveyor assembly to move the blank in a downstream direction of the system toward a carton erection assembly of the system, the carton erection assembly comprising an end flap engagement assembly positioned adjacent the at least one conveyor assembly, as shown in block 306. The method further includes rotating the end flap engagement assembly such that a portion of the end flap engagement assembly contacts and moves at least one end flap of the plurality of end flaps of the blank as the blank moves in the downstream direction, as shown in block 308.

In some examples, the end flap engagement assembly includes a hub member and an end flap engagement lug extending from the hub member, and the rotating the end flap engagement assembly includes contacting the at least one end flap with the end flap engagement lug, as shown in block 310. In some examples, the end flap engagement assembly further includes a hub adapter coupled to the hub member, the end flap engagement lug mounted on an arm coupled to the hub adapter, as shown in block 312. In some examples, the method further includes moving the position of the end flap engagement lug relative to the hub member, as shown in block 314. In some examples, the moving the position of the end flap engagement lug includes moving the end flap engagement lug relative to the arm, as shown in block 316. In some examples, the moving the position of the end flap engagement lug includes moving the arm relative to the hub adapter, as shown in block 318. In some examples, the moving the position of the end flap engagement lug includes moving the hub adapter relative to the hub member, as shown in block 320. In some examples, the hub member defines an interior recess for at least partially receiving a drive shaft, and rotating the end flap engagement assembly includes rotating the drive shaft, as shown in block 321.

In some examples, the carton erection assembly further includes an end flap diverting member positioned adjacent the end flap engagement assembly, the end flap diverting member having a sloped upper surface, and the method further includes moving the blank in a downstream direction into engagement with the end flap diverting member, as shown in block 322. In some examples, the moving the blank into engagement with the end flap diverting member includes moving the at least one end flap along the sloped upper surface of the end flap diverting member, as shown in block 324. In some examples, the at least one end flap is a first end flap of the plurality of end flaps, and the moving the blank into engagement with the end flap diverting member includes moving a second end flap of the plurality of end flaps below the end flap diverting member, as shown in block 326. In some examples, the carton forming assembly further includes a carton formation frame positioned adjacent the end flap diverting member, the carton formation frame having a sloped upper surface, and the method further includes moving the at least one end flap along the sloped upper surface of the carton formation frame, as shown in block 328.

In general, the blanks of the present disclosure may be constructed from paperboard having a caliper so that it is heavier and more rigid than ordinary paper. The blank can also be constructed of other materials, such as cardboard, or any other material having properties suitable for enabling the construct to function at least generally as described above. The blank can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A method of at least partially erecting a carton with a carton forming system, the method comprising:

loading a blank in a blank infeed assembly of the system, the blank comprising a plurality of panels and a plurality of end flaps foldably connected to a respective panel of the plurality of panels;

positioning the blank on at least one conveyor assembly of the system;

operating the at least one conveyor assembly to move the blank in a downstream direction of the system toward a carton erection assembly of the system, the carton erection assembly comprising an end flap engagement assembly positioned adjacent the at least one conveyor assembly, the end flap engagement assembly comprises a hub member and an end flap engagement lug extending from the hub member; and rotating the end flap engagement assembly such that the end flap engagement lug contacts and moves a first end flap and a second end flap of the plurality of end flaps of the blank as the blank moves in the downstream direction.

2. The method of claim 1, wherein the end flap engagement assembly further comprises a hub adapter coupled to the hub member, the end flap engagement lug mounted on an arm coupled to the hub adapter.

3. The method of claim 2, wherein the method further comprises moving the position of the end flap engagement lug relative to the hub member.

4. The method of claim 3, wherein the moving the position of the end flap engagement lug comprises moving the end flap engagement lug relative to the arm.

5. The method of claim 3, wherein the moving the position of the end flap engagement lug comprises moving the arm relative to the hub adapter.

6. The method of claim 3, wherein the moving the position of the end flap engagement lug comprises moving the hub adapter relative to the hub member.

7. The method of claim 2, wherein the hub member defines an interior recess for at least partially receiving a drive shaft, and rotating the end flap engagement assembly comprises rotating the drive shaft.

8. The method of claim 1, wherein the carton erection assembly further comprises an end flap diverting member positioned adjacent the end flap engagement assembly, the end flap diverting member having a sloped upper surface, and the method further comprises moving the blank in a downstream direction into engagement with the end flap diverting member.

9. The method of claim 8, wherein the moving the blank into engagement with the end flap diverting member comprises moving the first end flap along the sloped upper surface of the end flap diverting member.

10. The method of claim 9, wherein moving the blank into engagement with the end flap diverting member comprises moving the second end flap of the plurality of end flaps below the end flap diverting member.

11. The method of claim 10, wherein the carton forming assembly further comprises a carton formation frame positioned adjacent the end flap diverting member, the carton formation frame having a sloped upper surface, and the method further comprises moving the first end flap along the sloped upper surface of the carton formation frame.

12. A carton forming system for at least partially forming a carton, the system comprising:

a blank infeed assembly arranged to receive at least one blank comprising a plurality of panels and a plurality of end flaps foldably connected to a respective panel of the plurality of panels, the blank infeed assembly configured to position the at least one blank along a portion of the system;

at least one conveyor assembly positioned for receiving the at least one blank from the blank infeed assembly, the at least one conveyor assembly configured to move the at least one blank in a downstream direction of the system; and a carton erection assembly comprising an end flap engagement assembly positioned adjacent the at least one conveyor assembly, the end flap engagement assembly comprises a hub member, an end flap engagement lug extending from the hub member, and a hub adapter coupled to the hub member, the end flap engagement lug mounted on an arm movably coupled to the hub adapter such that the end flap engagement lug is repositionable relative to the hub member, the end flap engagement assembly rotatably mounted to the system such that the end flap engagement lug is positioned to rotate and move a first end flap and a second end flap of the plurality of end flaps when the at least one blank moves in the downstream direction of the system.

13. The system of claim 12, wherein the end flap engagement lug is movably coupled to the arm.

14. The system of claim 12, wherein the hub adapter is coupled to the hub member in selected rotational orientation of a plurality of rotational orientations.

15. The system of claim 12, wherein the hub member defines an interior recess for at least partially receiving a drive shaft of the system.

16. The system of claim 15, wherein the end flap engagement assembly further comprises a clamping apparatus operably coupled with the hub member, the clamping apparatus biased toward a preselected position relative to the interior recess to facilitate engagement with a drive shaft of the system.

17. The system of claim 16, wherein the carton forming assembly further comprises a carton formation frame positioned adjacent the end flap diverting member, the carton formation frame having a sloped upper surface positioned for slidably engaging the first end flap.

18. The system of claim 12, wherein the carton erection assembly further comprises an end flap diverting member positioned adjacent the end flap engagement assembly, the end flap diverting member having a sloped upper surface positioned for slidable engagement with the end flap.

19. An end flap engagement assembly, comprising:

a hub member, a hub adapter coupled to the hub member, an end flap engagement lug mounted on an arm coupled to the hub adapter, and a hub adapter coupled to the hub member, the end flap engagement lug mounted on an arm slidably coupled to the hub adapter such that the end flap engagement lug is repositionable relative to the hub member, the hub member defines an interior recess for at least partially receiving a drive shaft such that the end flap engagement lug is positionable to contact and move a first end flap and a second end flap of a blank positioned proximate the end flap engagement assembly when the drive shaft is rotated.

20. The end flap engagement assembly of claim 19, wherein the end flap engagement lug is movably coupled to the arm.

21. The end flap engagement assembly of claim 19, wherein the hub adapter is coupled to the hub member in selected rotational orientation of a plurality of rotational orientations.

22. The end flap engagement assembly of claim 19, wherein the end flap engagement assembly further comprises a clamping apparatus operably coupled with the hub member, the clamping apparatus biased toward a preselected position relative to the interior recess for facilitating engagement with a drive shaft.

* * * * *